US010146972B2

(12) United States Patent
Aoki et al.

(10) Patent No.: US 10,146,972 B2
(45) Date of Patent: Dec. 4, 2018

(54) MANAGEMENT SYSTEM, MANAGEMENT APPARATUS, MANAGEMENT METHOD, AND MANAGEMENT PROGRAM

(71) Applicant: KONICA MINOLTA, INC., Chiyoda-ku, Tokyo (JP)

(72) Inventors: Kentaro Aoki, Toyohashi (JP); Akinori Tadokoro, Toyokawa (JP)

(73) Assignee: KONICA MINOLTA., INC., Tokyo (JP)

(*) Notice: Subject to any disclaimer, the term of this patent is extended or adjusted under 35 U.S.C. 154(b) by 0 days.

(21) Appl. No.: 15/696,883

(22) Filed: Sep. 6, 2017

(65) Prior Publication Data
US 2018/0068140 A1    Mar. 8, 2018

(30) Foreign Application Priority Data

Sep. 7, 2016  (JP) ................................. 2016-174454
Sep. 15, 2016  (JP) ................................. 2016-180261

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01); *G06K 7/1417* (2013.01)

(58) Field of Classification Search
CPC . G06K 7/10722; G06K 7/1413; G06K 7/1417

USPC ......................................................... 235/385
See application file for complete search history.

(56) References Cited

U.S. PATENT DOCUMENTS

| 9,846,857 B2* | 12/2017 | Stout ................. G06K 7/10732 |
| 2006/0210115 A1* | 9/2006 | Nemet ................. G05D 1/0234 382/104 |
| 2009/0115609 A1* | 5/2009 | Weaver ................. G06Q 10/08 340/572.1 |
| 2018/0025310 A1* | 1/2018 | Gabbai ................. G06Q 10/087 705/28 |

FOREIGN PATENT DOCUMENTS

JP    2008009656 A    1/2008

* cited by examiner

*Primary Examiner* — Seung Lee
(74) *Attorney, Agent, or Firm* — Holtz, Holtz & Volek PC

(57) ABSTRACT

A management system includes: a reader that reads item information related to a target item from the target item; an identifier that identifies an authorized storage location where the target item is required to be stored, on the basis of the item information read by the reader; an acquisitor that acquires a reading location where the item information has been read; and a determiner that compares the authorized storage location with the reading location and determines whether or not the target item is stored in the authorized storage location.

9 Claims, 20 Drawing Sheets

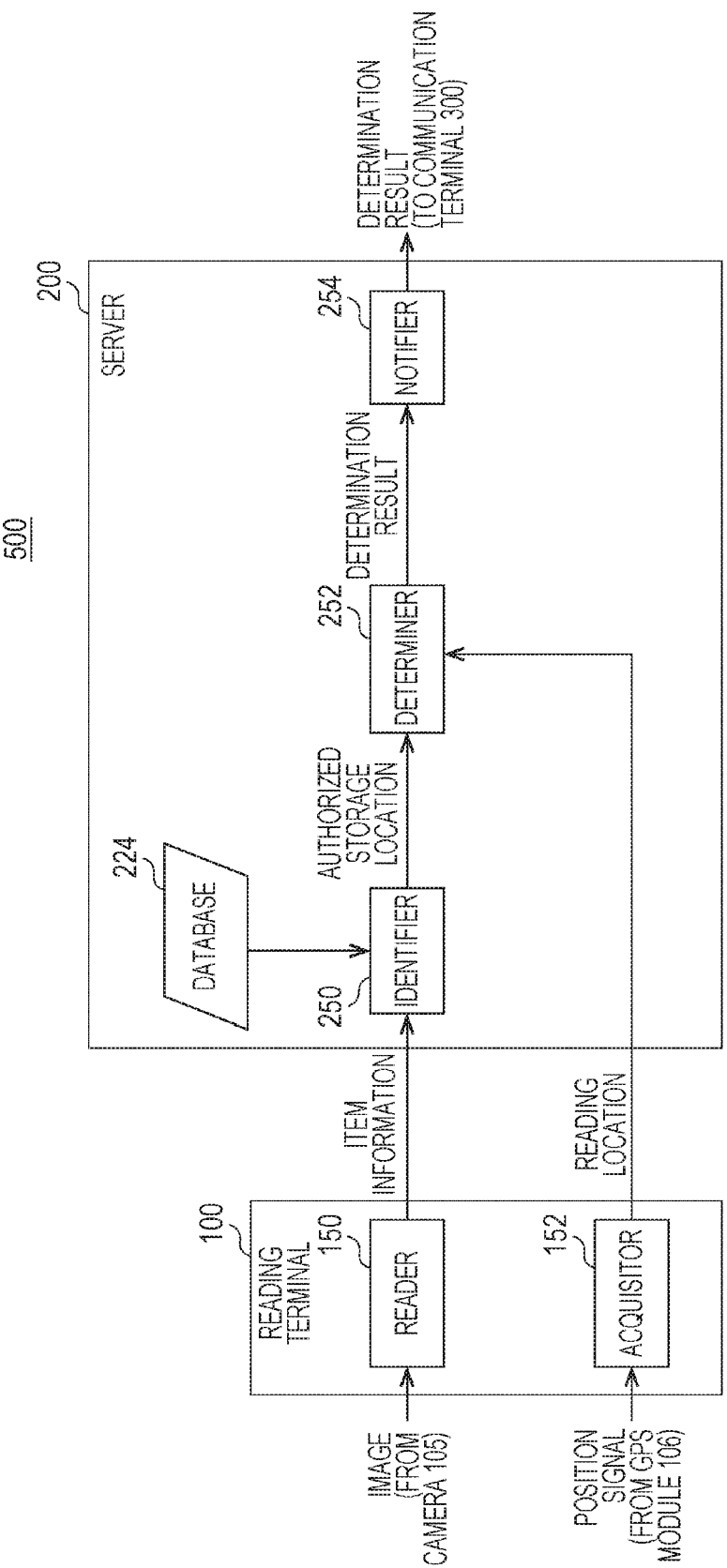

FIG. 3    224

| ITEM ID | ITEM NAME | STORAGE LOCATION | LOT NUMBER |
|---|---|---|---|
| 000001 | A | $x_1, y_1$ | ○○○○-○○ |
| 000002 | B | $x_2, y_2$ | ○○○○-○○ |
| 000003 | C | $x_3, y_3$ | ○○○○-○○ |
| ⋮ | ⋮ | ⋮ | ⋮ |

*FIG. 4*

| ITEM | DATE AND TIME | DETERMINATION RESULT | DISTANCE | DETAILS |
|---|---|---|---|---|
| A | 8/23/2016 | OK | 2m | CHECK |
| B | 8/23/2016 | OK | 0m | CHECK |
| C | 8/23/2016 | NG | 10km | CHECK |
| D | 8/23/2016 | OK | 10m | CHECK |
| E | 8/22/2016 | OK | 0m | CHECK |
| ⋮ | ⋮ | ⋮ | ⋮ | ⋮ |

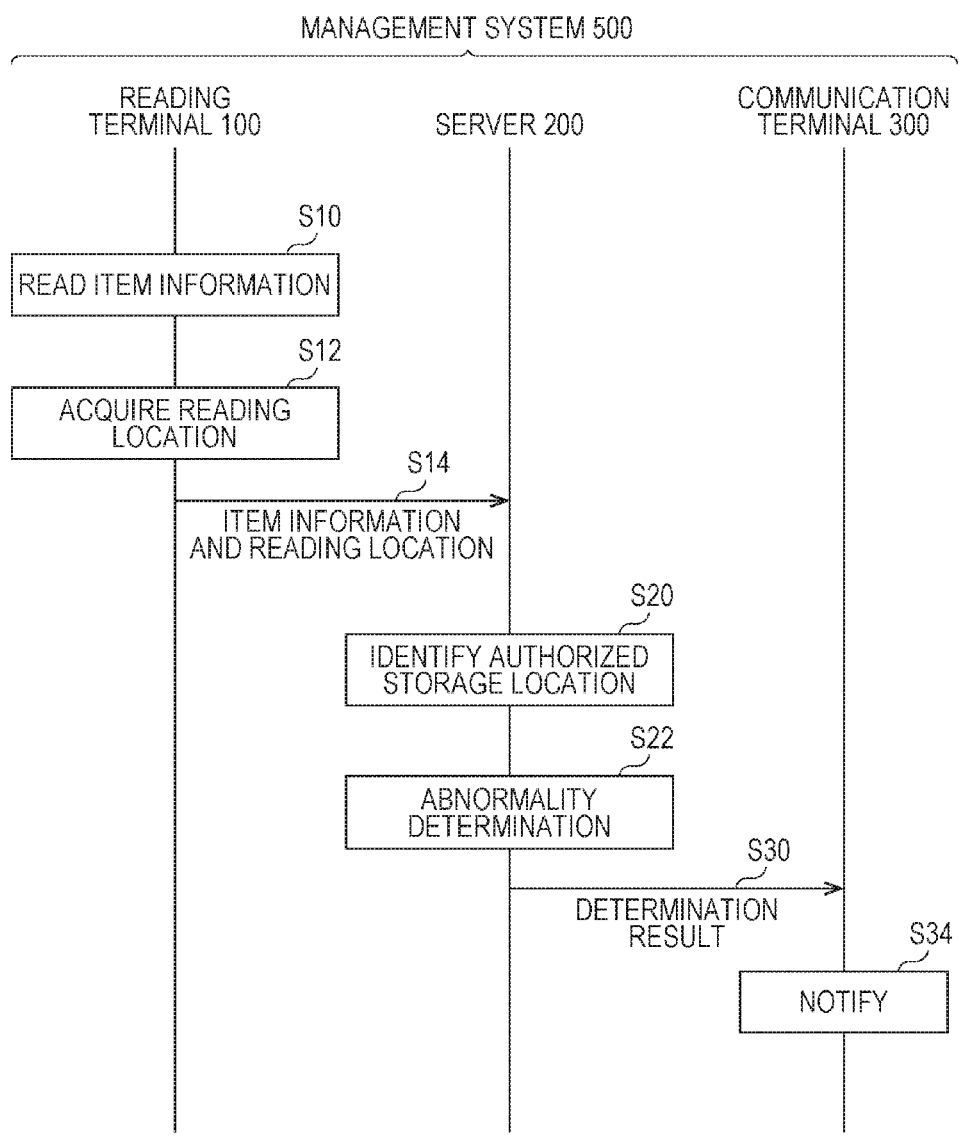

FIG. 11
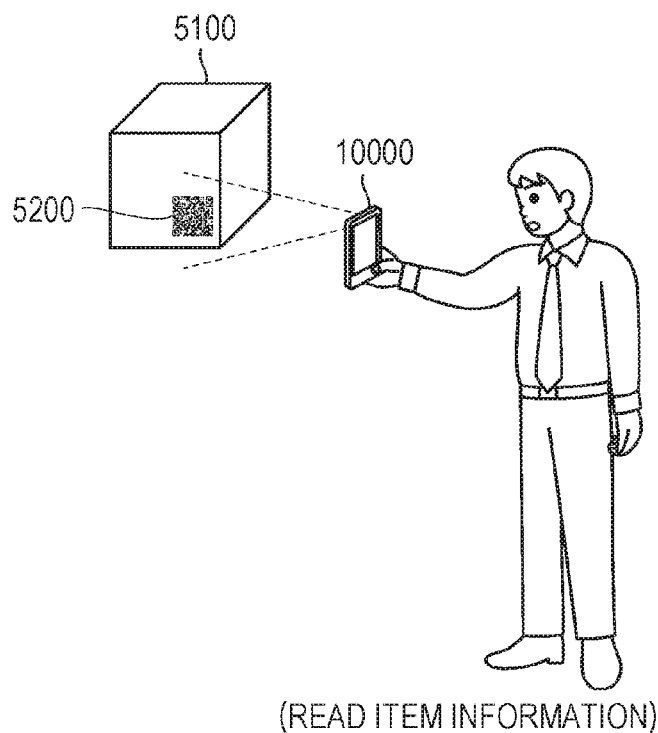
(READ ITEM INFORMATION)
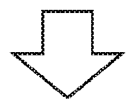
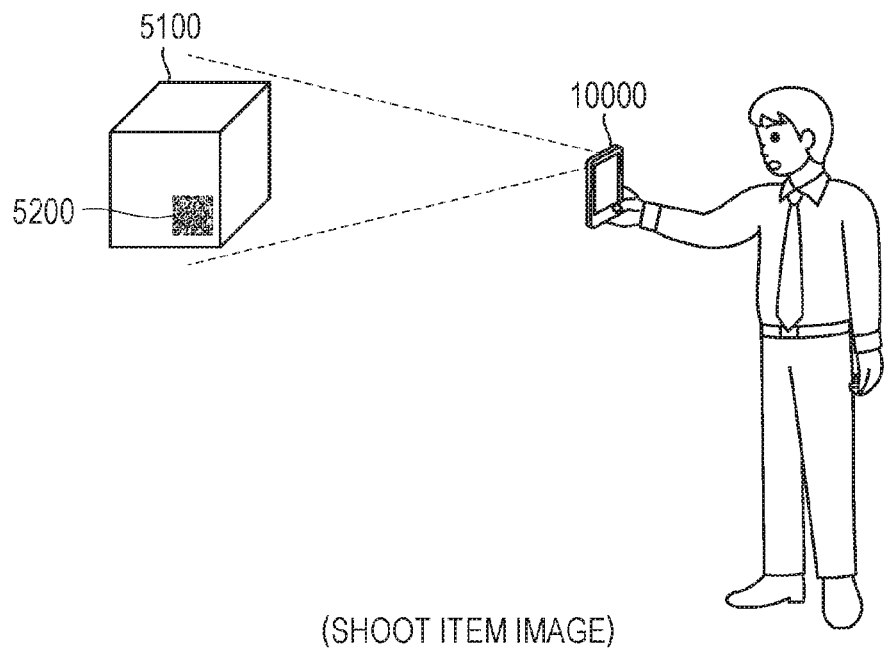
(SHOOT ITEM IMAGE)

FIG. 13
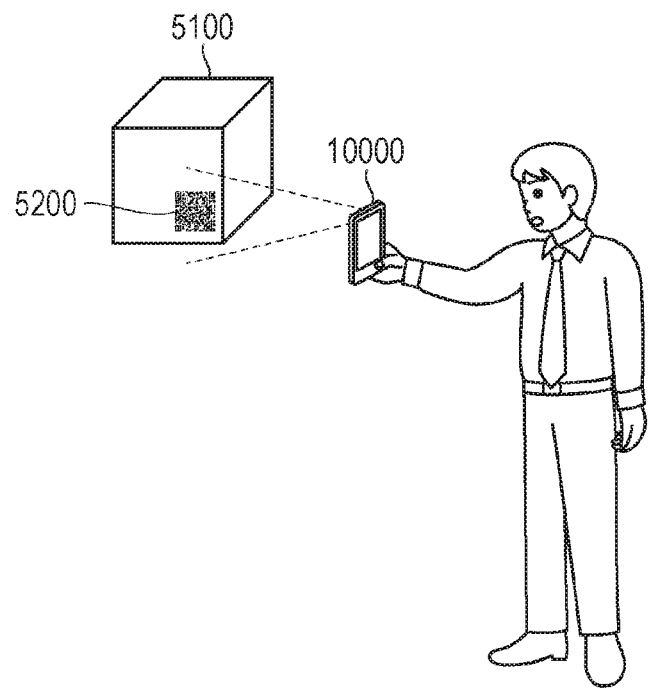
(AT TIME OF SHOOTING QR CODE: NORMAL SHOOTING MODE)
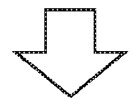
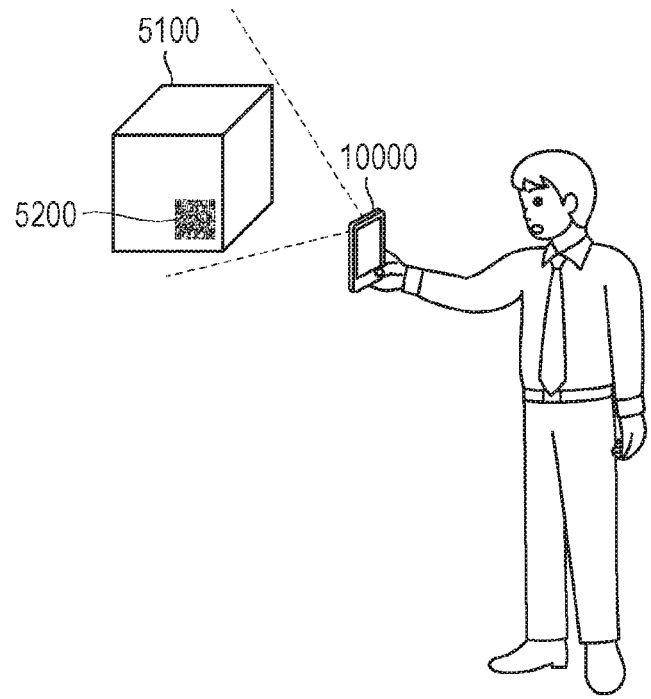
(AT TIME OF SHOOTING TARGET ITEM: WIDE-ANGLE SHOOTING MODE)

| ITEM INFORMATION | | | ITEM IMAGE (FILE PATH) |
|---|---|---|---|
| ITEM ID | ITEM NAME | LOT NUMBER | |
| 000001 | A | ○○○○-○○ | c:¥··· |
| 000002 | B | ○○○○-○○ | c:¥··· |
| 000003 | C | ○○○○-○○ | c:¥··· |
| ⋮ | ⋮ | ⋮ | ⋮ |

MANAGEMENT SYSTEM, MANAGEMENT APPARATUS, MANAGEMENT METHOD, AND MANAGEMENT PROGRAM

Japanese Patent Application No. 2016-174454 filed on Sep. 7, 2016 and No. 2016-180261 filed on Sep. 15, 2016, including description, claims, drawings, and abstract the entire disclosures are incorporated herein by reference in its entirety.

BACKGROUND

Technological Field

The present disclosure relates to a technology for managing items, and particularly relates to a technology for managing item storage locations.

Description of the Related Art

QR codes (registered trademark) are used to manage items. A QR code is associated with, for example, the location and date and time of manufacture of an item. A manager can check item information by reading a QR code attached to a product with a reading terminal such as a barcode reader.

In terms of the technology for managing items, JP 2008-9656 A discloses a used good management apparatus that can manage used goods with QR codes. The used good management apparatus associates an image obtained by shooting a used good with the receipt time, receipt location, and the like of the used good, records the image in a server, and also issues the information of them as a QR code. The manager can check the state of the used good at the time of receipt, the receipt time of the used good, the receipt location of the used good, and the like by reading the QR code attached to the used good with a reading terminal.

A mold for molding a resin part is cited as another example of a management target item. In the manufacturing industry, a management company lends a mold to a subcontractor. A person in charge of the subcontractor reads a QR code attached to the mold with a reading terminal and transmits the reading result to the management company; accordingly, the management company can check the state of the mold.

In recent years, there has been a problem that the subcontractor moves the mold to a storage location where the management cost is lower in contradiction to a contract with the management company. If the mold is stored under a bad environment, the dimension changes, rust forms on the mold, and the mold is deteriorated. Hence, the mold needs to be stored under an appropriate environment. Therefore, a management system is desired which can manage the storage of the mold in an authorized storage location.

A product is cited as a still another example of a management target item. If the product is stored in a location different from an authorized storage location, the distance to a location to which the product is delivered is increased. Accordingly, additional time and cost are required. Therefore, a technology for managing the storage of the product in the authorized storage location is desired.

A product such as a mold part is cited as still another example of a management target item. A supplier checks item information obtained by reading a QR code to allow a manager of the product to check the state of the product. At this point in time, it is insufficient to simply check the item information to check the state of a flaw and the like. Hence, a management system is desired which can obtain information for checking the state of an item such as a product in more detail.

SUMMARY

The present disclosure has been made to solve the abovementioned problems. An object thereof in an aspect is to provide a management system. An object in another aspect is to provide a management apparatus. An object in still another aspect is to provide a management method. An object in still another aspect is to provide a management program.

Moreover, an object in an aspect is to provide a management system. An object in another aspect is to provide a management apparatus. An object in still another aspect is to provide an item management method. An object in still another aspect is to provide an item management program.

To achieve at least one of the abovementioned objects, according to an aspect of the present invention, a management system reflecting one aspect of the present invention comprises: a reader that reads item information related to a target item from the target item; an identifier that identifies an authorized storage location where the target item is required to be stored, on the basis of the item information read by the reader; an acquisitor that acquires a reading location where the item information has been read; and a determiner that compares the authorized storage location with the reading location and determines whether or not the target item is stored in the authorized storage location.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 2 is a diagram illustrating an example of the functional configuration of the management system according to the first embodiment;

FIG. 3 is a diagram illustrating a database specifying an item storage location according to item identification information in the first embodiment;

FIG. 4 is a diagram illustrating an example of a screen presenting determination results of a determiner in the first embodiment;

FIG. 6 is a sequence diagram illustrating the floor of data between a reading terminal, a server, and a communication terminal in the first embodiment;

FIG. 11 is a diagram illustrating how an operator on a site reads a QR code with a reading terminal in the second embodiment;

FIG. 13 is a diagram illustrating how a shooting mode of a camera is switched between before and after the detection of a QR code in the second embodiment;

DETAILED DESCRIPTION OF EMBODIMENTS

Figure 1:
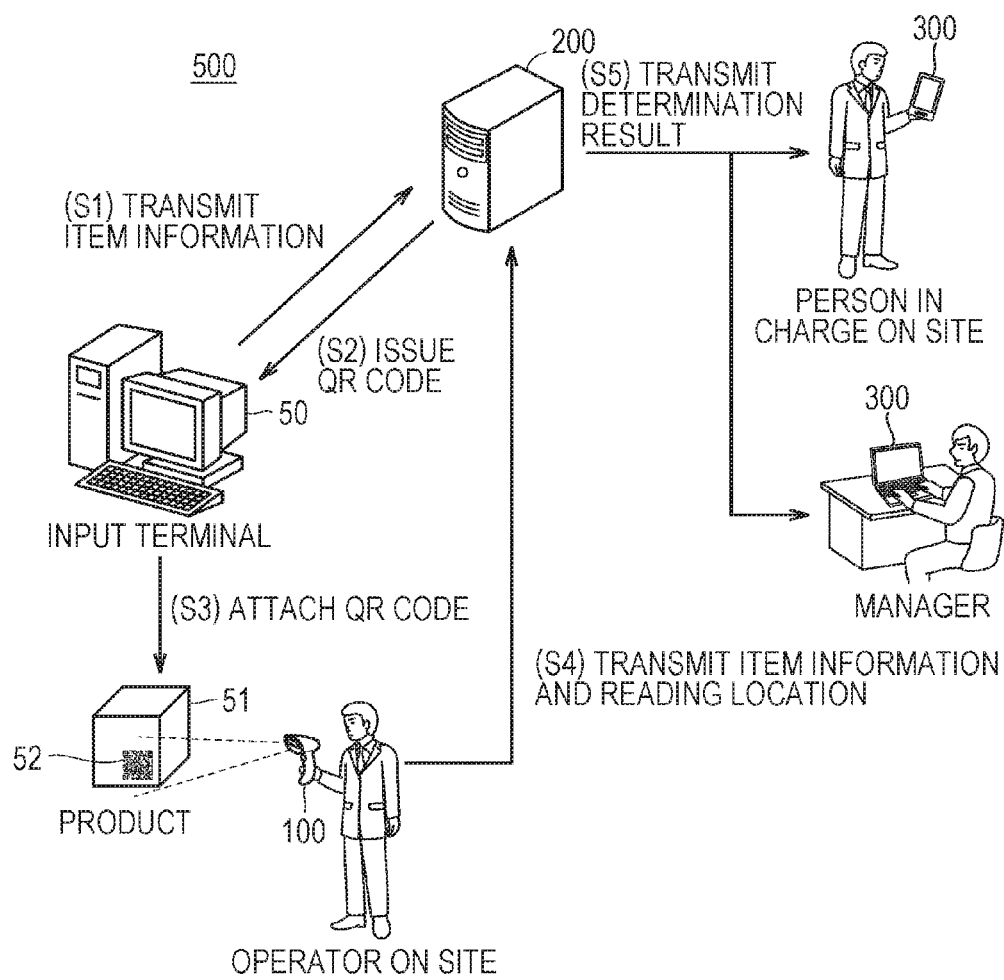
FIG. 1 is a diagram illustrating an example of the system configuration of a management system according to a first embodiment.

Hereinafter, one or more embodiments of the present invention will be described with reference to the drawings. However, the scope of the invention is not limited to the disclosed embodiments.

First Embodiment

In the following description, the same reference numerals are assigned to the same parts and constituent elements. Their names and functions are also the same. Therefore, their detailed descriptions are not repeated. The embodiments and modifications described below may be selectively combined as appropriate.

[Management System 500]

The system configuration of a management system 500 is described with reference to FIG. 1. FIG. 1 is a diagram illustrating an example of the system configuration of the management system 500.

The management system 500 manages an item 51 and the like. For example, a product, a part, a mold, and other thing are cited as the item 51 targeted for management. As illustrated in FIG. 1, the management system 500 is configured including, for example, an input terminal 50, a reading terminal 100, a server 200, and communication terminals 300.

The input terminal 50 accepts an input of item information related to the item 51 targeted for management. As an example, a manager can input the identification number of the item 51, an authorized storage location where the item 51 needs to be stored, the date and time of manufacture of the item 51, the location of manufacture of the item 51, and the like, as the item information, into the input terminal 50. When the input of the item information is completed, the input terminal 50 transmits the inputted item information to the server 200 as illustrated in step S1.

When receiving the inputted item information from the input terminal, the server 200 stores the item information, and encodes the item information. The item information may be encoded as a two-dimensional barcode such as a QR code, or may be encoded as a one-dimensional barcode. In the example of FIG. 1, the server 200 encodes the inputted item information as a QR code. The issued QR code is transmitted to the input terminal 50 as illustrated in step S2.

When receiving the QR code from the server 200, the input terminal 50 prints out the QR code. The manager attaches the QR code 52 printed out to the item 51. The item 51 is then transmitted to a site (for example, a lending destination or a delivery destination).

The manager checks whether or not the transmitted item 51 is stored in the authorized storage location, regularly such as at the time of stocktaking. More specifically, an operator on the site reads the QR code 52 with the reading terminal 100. The reading terminal 100 is, for example, a barcode reader, a smartphone, a tablet terminal, or other mobile terminal including a reading function of a QR code. The reading terminal 100 decodes the read QR code 52 to read the item information related to the item 51.

The reading terminal 100 acquires a reading location where the QR code 52 was read concurrently with the reading of the QR code 52. As an example, a position detection device such as a GPS module 106 (refer to FIG. 9) described below is mounted in the reading terminal 100, which acquires the current position at the time of the reading of the QR code 52 as the reading location from the position detection device. As illustrated in step S4, the reading terminal 100 transmits, to the server 200, the reading location acquired from the position detection device and the item information obtained from the QR code 52.

The server 200 identifies the authorized storage location of the item 51 on the basis of the item information received from the reading terminal 100. The server 200 then compares the authorized storage location of the item 51 with the reading location received from the reading terminal 100, and determines whether or not the item 51 is stored in the authorized storage location. As illustrated in step S5, the determination result is transmitted to the communication terminal 300 of a person in charge on the site and the communication terminal 300 of the manager in a remote location. Consequently, the person in charge on the site and the manager can check whether or not the item 51 is stored in the authorized storage location.

In the above description, the example Where the item information related to the item 51 is read from the QR code 52 is described. However, the item information related to the item 51 may be read from a tag such as radio frequency identifier (RFID). The tag holds the item information related to the item 51. The reading terminal 100 reads the item information from the tag by near-field communication using the electromagnetic field or radio waves.

Moreover, in FIG. 1, the example where the management system 500 is configured including the reading terminal 100, the input terminal 50, the server 200, and the communication terminals 300 is described. However, the management system 500 may include at least one of the reading terminal 100 and the server 200. Moreover, a part or all of the functions of the reading terminal 100 may be mounted in the server 200 and the communication terminal 300. Alternatively, a part or all of the functions of the server 200 may be mounted in the reading terminal 100 and the communication terminal 300. In other words, one of the reading terminal 100 and the server 200 may be configured as the management apparatus, or the reading terminal 100 and the server 200 may be integrally configured as the management apparatus.

Moreover, FIG. 1 illustrates the example where the management system 500 is configured including one reading terminal 100. However, the management system 500 may be configured including a plurality of the reading terminals 100. FIG. 1 illustrates the example where the management system 500 is configured including one server 200. However, the management system 500 may be configured including a plurality of the servers 200. FIG. 1 illustrates the example where the management system 500 is configured including a plurality of the communication terminals 300. However, the management system 500 may be configured including one communication terminal 300.

[The Functional Configuration of the Management System 500]

The functions of the management system 500 are described with reference to FIG. 2. FIG. 2 is a diagram illustrating an example of the functional configuration of the management system 500. As illustrated in FIG. 2, the management system 500 includes the reading terminal 100 and the server 200.

The reading terminal 100 includes a reader 150 and an acquisitor 152 as the functional configuration. The server 200 includes an identifier 250, a determiner 252, and a notifier 254 as the functional configuration. The functional configurations of the reading terminal 100 and the server 200 are sequentially described below.

At least part of the reader 150 and the acquisitor 152 may be mounted in the server 200. Moreover, at least part of the identifier 250, the determiner 252, and the notifier 254 may be mounted in the reading terminal 100.

(Reader 150)

The reader 150 detects a QR code from an image obtained by shooting an item targeted for management (hereinafter also referred to as "target item"), and decodes the encoded QR code to read item information. A method for reading a QR code with the reader 150 is described below.

The QR code has a rectangular shape. Patterns for position detection called finder patterns are placed at three corners of the QR code. Moreover, square cells are arranged in a grid in the QR code. Each cell is represented in black or white.

The reader 150 detects the finder patterns of the QR code to detect the QR code from the image on the basis of the positional relationship of the three finder patterns. The reader 150 converts, into numbers, the arrangement pattern of the black and white cells in the detected QR code, and accordingly reads the item information from the QR code. The item information includes, for example, the identification number of the item, the authorized storage location of the item, the date and time of manufacture of the item, and the location of manufacture of the item. The read item information is transmitted to the server 200.

In the above description, the example where the reader 150 reads item information from a QR code is described. However, the reader 150 may read item information from some other two-dimensional barcode. Alternatively, the reader 150 may read item information from a one-dimensional barcode. Alternatively, the reader 150 may read item information from a tag such as RFID.

(Acquisitor 152)

The acquisitor 152 acquires the current position of the reading terminal 100 on the basis of the fact that reader 150 has read item information. A method where the acquisitor 152 acquires the current position is described below.

Various methods can be employed as the method where the acquisitor 152 acquires the current position. In an aspect, the acquisitor 152 acquires the current position of the reading terminal 100 on the basis of satellite positioning signals received by the GPS module 106 (refer to FIG. 9) described below. The reading location is expressed in, for example, latitude and longitude.

In another aspect, the acquisitor 152 acquires the current position of the reading terminal 100 on the basis of a signal received from a communication device such as an antenna of a base station or an access point of wireless fidelity (WiFi). More specifically, the signal transmitted from the communication device includes an identifier (for example, service set identifier: SSID) of the communication device. The reading terminal 100 holds in advance communication device information that specifies an installation location of each communication device. The reading terminal 100 identifies an installation location corresponding to an identifier received from the communication device, among the installation locations specified in the communication device information. On the other hand, the reading terminal 100 calculates a distance from the installation location on the basis of the strength of the received signal of the communication device. The acquisitor 152 acquires the current position of the reading terminal 100 on the basis of the installation location of the communication device and the distance from the installation location.

The current position acquired at the time of the reading of the QR code is regarded as the reading location of the item information. The acquired reading location is transmitted to the server 200.

(Identifier 250)

The identifier 250 identifies the authorized storage location of the target item on the basis of the item information read by the reader 150. A method for identifying a storage location of an item is described below with reference to FIG. 3. FIG. 3 is a diagram illustrating a database 224 that specifies item storage locations according to item identification information.

The item identification information is expressed as, for example, an item identification (ID). An item name, an authorized storage location, and a lot number are associated on an item ID basis in the database 224. As an example, the storage location specified in the database 224 is expressed in latitude and longitude. The storage location may be expressed as a point or an area.

The identifier 250 identifies an item ID that agrees with an item ID included in the item identification read by the reader 150, from the item IDs specified in the database 224. The identifier 250 identifies a storage location associated with the identified item ID as an authorized storage location of the target item in the database 224. The identified authorized storage location is outputted to the determiner 252.

The method for identifying an authorized storage location is not limited to the above-mentioned example. For example, a QR code itself may specify location information indicating an authorized storage location of an item. In other words, an authorized storage location is included in item information read from a QR code. In this case, the identifier 250 identifies a storage location included in item information received from the reading terminal 100 as an authorized storage location of a target item.

(Determiner 252)

The determiner 252 compares the authorized storage location identified by the identifier 250 with the reading location of the QR code acquired by the acquisitor 152, and determines whether or not the target item is stored in the authorized storage location. The determination method is described below.

The determiner 252 calculates a distance between the authorized storage location identified by the identifier 250 and the reading location of the QR code acquired by the acquisitor 152. If the distance between the authorized storage location and the reading location is within a predetermined threshold (for example, 100), the determiner 252 determines that the target item is stored in the authorized storage location. On the other hand, if the distance between the authorized storage location and the reading location exceeds the predetermined threshold (for example, 100 m), the determiner 252 determines that the target item is not stored in the authorized storage location.

In this manner, the determiner 252 determines whether or not the target item is stored in the authorized storage location according to whether or not the reading location is a certain distance away from the authorized storage location. The determination result of the determiner 252 is outputted to the notifier 254.

(Notifier 254)

The notifier 254 notifies a plurality of the communication terminals 300 (refer to FIG. 1) of the determination result of the determiner 252. The notifier 254 preferably changes a notification destination of the determination result according to the determination result of the determiner 252. The relationship between the determination result and its notification destination may be specified in advance, or freely set.

As an example, if the target item is stored in the authorized storage location, the notifier 254 transmits the determination result of the determiner 252 to the communication terminal 300 of the person in charge on the site (refer to FIG. 1), and does not transmit the determination result to the communication terminal 300 of the manager (refer to FIG. 1). On the other hand, if the target item is not stored in the authorized storage location, the notifier 254 transmits the determination result of the determiner 252 to both of the communication terminal 300 of the person in charge on the site and the communication terminal 300 of the manager. At this point in time, the notifier 254 notifies the communication terminals 300 of an abnormality in the storage location of the target item.

The content of the notification of the notifier 254 to the communication terminals 300 is not limited to the determination result of the determiner 252. As an example, the notifier 254 notifies the communication terminals 300 of the distance between the authorized storage location and the reading location of the QR code. Consequently, the manager and the person in charge on the site can easily grasp how far a position where the target item is stored is from the authorized storage location.

In addition, the notifier 254 may notify the communication terminals 300 of a map image presenting the authorized storage location and the reading location. The map image may be acquired from a mapping site such as Google Maps (registered trademark), or may be stored in advance in the communication terminals 300. Every location in the map image is associated with location information such as latitude and longitude. The reading terminal 100 places an icon indicating an authorized storage location at a position on the map image corresponding to the authorized storage location, and places an icon indicating a reading location at a position on the map image corresponding to the reading location. The notifier 254 then transmits the map image to the communication terminal 300. Consequently, the manager and the person in charge on the site can visually check the reading location of the QR code and the authorized storage location of the target item.

In addition, the notifier 254 may notify the communication terminals 300 of area information indicating the authorized storage location and area information indicating the reading location of the QR code. For example, notice of an address and a facility name is given as the area information. Consequently, the manager and the person in charge on the site can easily grasp the area information of the reading location of the QR code, and the area information of the authorized storage location of the target item.

[A Notification Screen of the Communication Terminal 300]

Figure 5A:
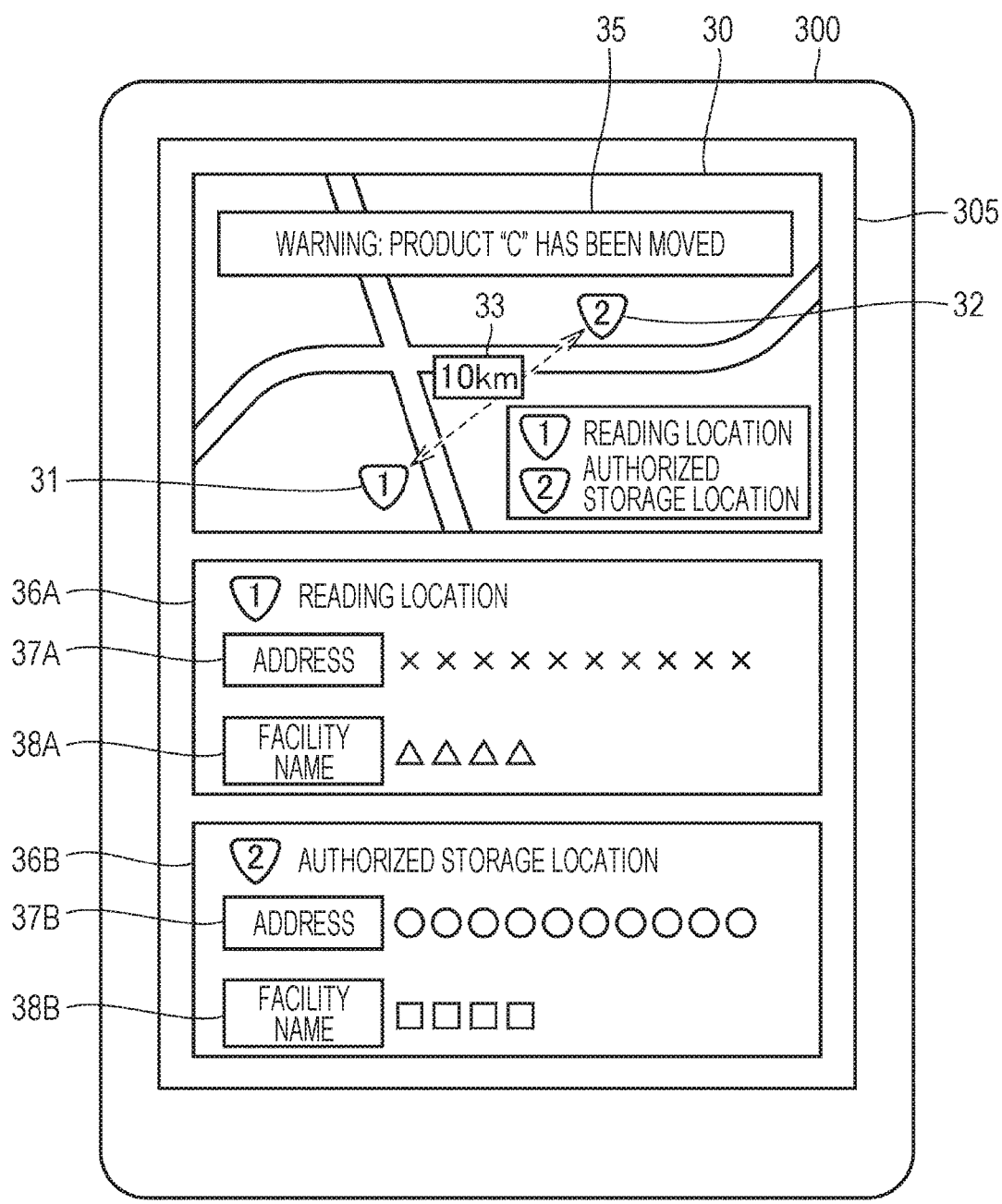
FIGS. 5A and 5B are diagrams illustrating an example of a details screen of a determination result of the determiner in the first embodiment.
Figure 5B:
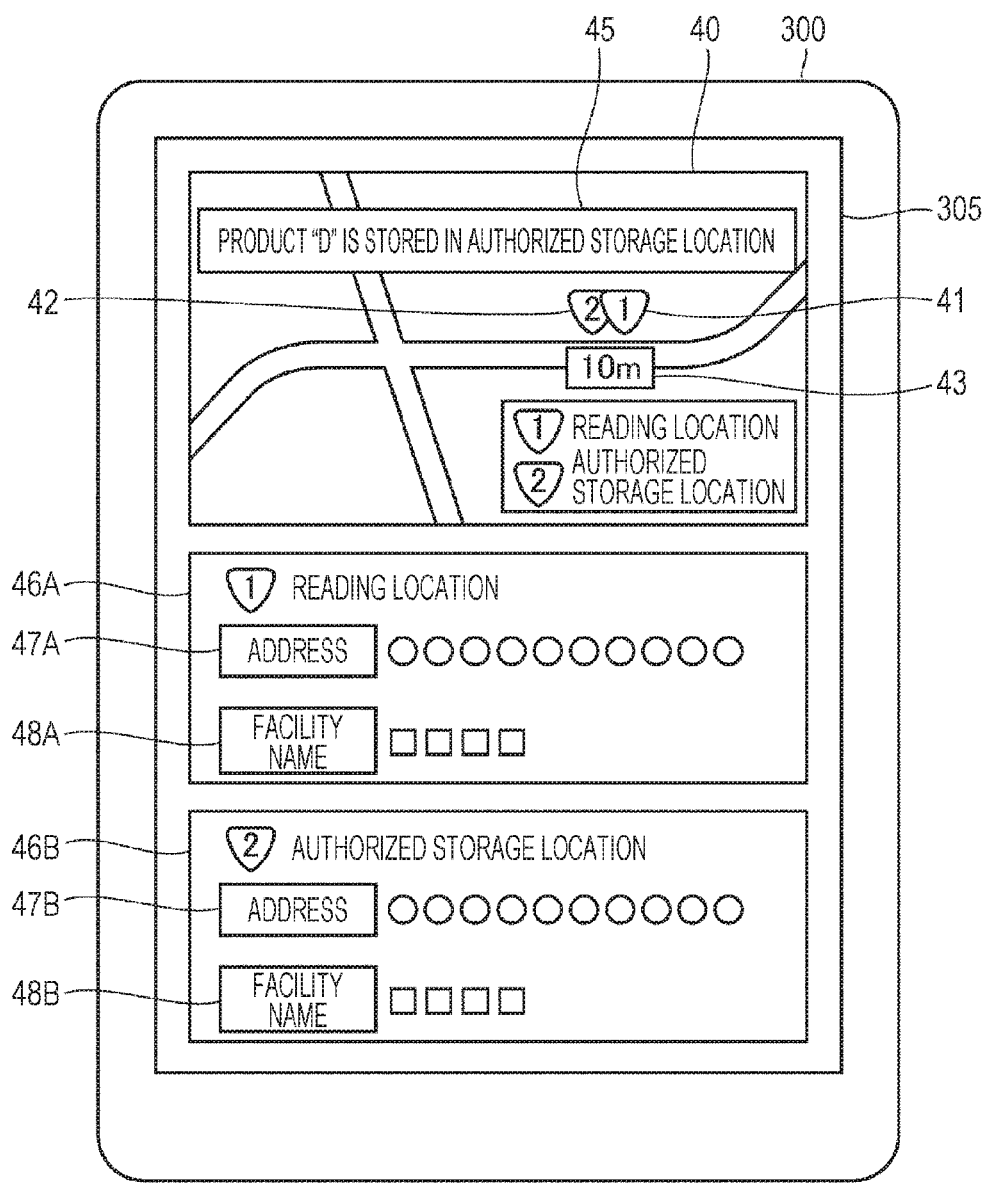

A notification screen of the communication terminal 300 is described with reference to FIGS. 4, 5A, and 5B. FIG. 4 is a diagram illustrating an example of a screen presenting determination results of the determiner 252.

When receiving determination results of the determiner 252 from the server 200, the communication terminal 300 displays a determination result of each item as a list 20 on a display 305. The list 20 contains an item field 21 indicating the name of an item targeted for management, a date and time field 22 indicating the date and time of a determination of the determiner 252, a result field 23 indicating a determination result of the determiner 252, a distance field 24 indicting the distance between the storage location and the reading location, and a button field 25. The display of the list 20 allows the manager or the person in charge on the site to easily grasp the determination result of each item.

For example, the determination result presented in the result field 23 is expressed as "OK" if a target product is stored in its authorized storage location, and as "NG" if a target product is not stored in its authorized storage location. Preferably, the communication terminal 300 displays an entry of the determination result "NO" in a different form from an entry of the determination result "OK."

The manager or person in charge on the site presses any in the button field 25 of the list 20 and accordingly can check a determination result of a corresponding item in detail. FIGS. 5A and 5B are diagrams illustrating an example of a details screen of a determination result of the determiner 252.

For example, the manger presses a check button 26 to check a determination result of an item "C" whose determination result is "NG". As a result, a details screen of the determination result of the item "C" is displayed on the display 305 as illustrated in FIG. 5A. The details screen includes a map image 30, area information 36A of a reading location of a QR code, and area information 36B of an authorized storage location of the item "C".

An icon 31 represents the reading location of the QR code, and an icon 32 the authorized storage location of the item "C" on the map image 30. Moreover, a distance image 33 indicating a distance between the reading location of the QR code and the authorized storage location of the item "C" is displayed on the map image 30. Furthermore, a warning 35 indicating that the item "C" has been moved from the authorized storage location is displayed on the map image 30.

The area information 36A includes an address 37A of the reading location of the QR code and a facility name 38A of the reading location. The area information 36B includes an address 37B of the authorized storage location of the item "C" and a facility name 38B of the storage location.

As another example, the manager presses a check button 27 to check a determination result of an item "D" whose determination result is "OK". As a result, a details screen of the determination result of the item "D" is displayed on the display 305 as illustrated in FIG. 5B. The details screen includes a map image 40, area information 46A of the reading location of the QR code, and area information 46B of an authorized location of the item "D".

An icon 41 represents the reading location of the QR code and an icon 42 the authorized storage location of the item "D" on the map image 40. Moreover, a distance image 43 indicating a distance between the reading location of the QR code and the authorized storage location of the item "D" is displayed on the map image 40. Furthermore, a message 45 indicating that the item "D" is stored in the authorized storage location is displayed on the map image 40.

The area information 46A includes an address 47A of the reading location of the QR code and a facility name 48A of the reading location. The area information 46B includes an address 47B of the authorized storage location of the item "D" and a facility name 48B of the storage location.

[Data Flow]

The flow of data in the management system 500 is described with reference to FIG. 6. FIG. 6 is a sequence diagram illustrating the flow of data between the reading terminal 100, the server 200, and the communication terminal 300.

In step S10, the reading terminal 100 detects a QR code from an image obtained by shooting a target item, decodes the QR code, and accordingly reads item information related to the target item.

In step S12, the reading terminal 100 acquires the current position of the reading terminal 100 on the basis of a fact that the QR code has been read. The current position is regarded as the reading location of the QR code.

In step S14, the reading terminal 100 transmits, to the server 200, the item information read in step S10 and the reading location acquired in step S12.

In step S20, the server 200 identifies an authorized storage location where the target item needs to be stored, on the basis of the item information received from the reading terminal 100. The method for identifying an authorized storage location is as described in FIG. 3. Therefore, its description is not repeated.

In step S22, the server 200 compares the authorized storage location identified in step S20 with the reading location received from the reading terminal 100, and determines whether or not the target item is stored in the authorized storage location. More specifically, the server 200 calculates the distance between the authorized storage location and the reading location. The server 200 determines that the target item is stored in the authorized storage location if the calculated distance is within the predetermined threshold (for example, 100). On the other hand, the server 200 determines that the target item is not stored in the authorized storage location if the calculated distance is longer than the predetermined threshold (for example, 100 m).

In step S30, the server 200 transmits the determination result of step S22 to the communication terminal 300.

In step S34, the communication terminal 300 gives notice of the determination result received from the server 200. Notice of the determination result is given by any given method. As an example, a message presenting the determination result, or the like is displayed on the communication terminal 300. Alternatively, the determination result is issued as voice from the communication terminal 300. Consequently, the person in charge on the site (refer to FIG. 1) and the manager (refer to FIG. 1) can check whether or not the target item is stored in the authorized storage location.

[The Control Structure of the Reading Terminal 100]

Figure 7:
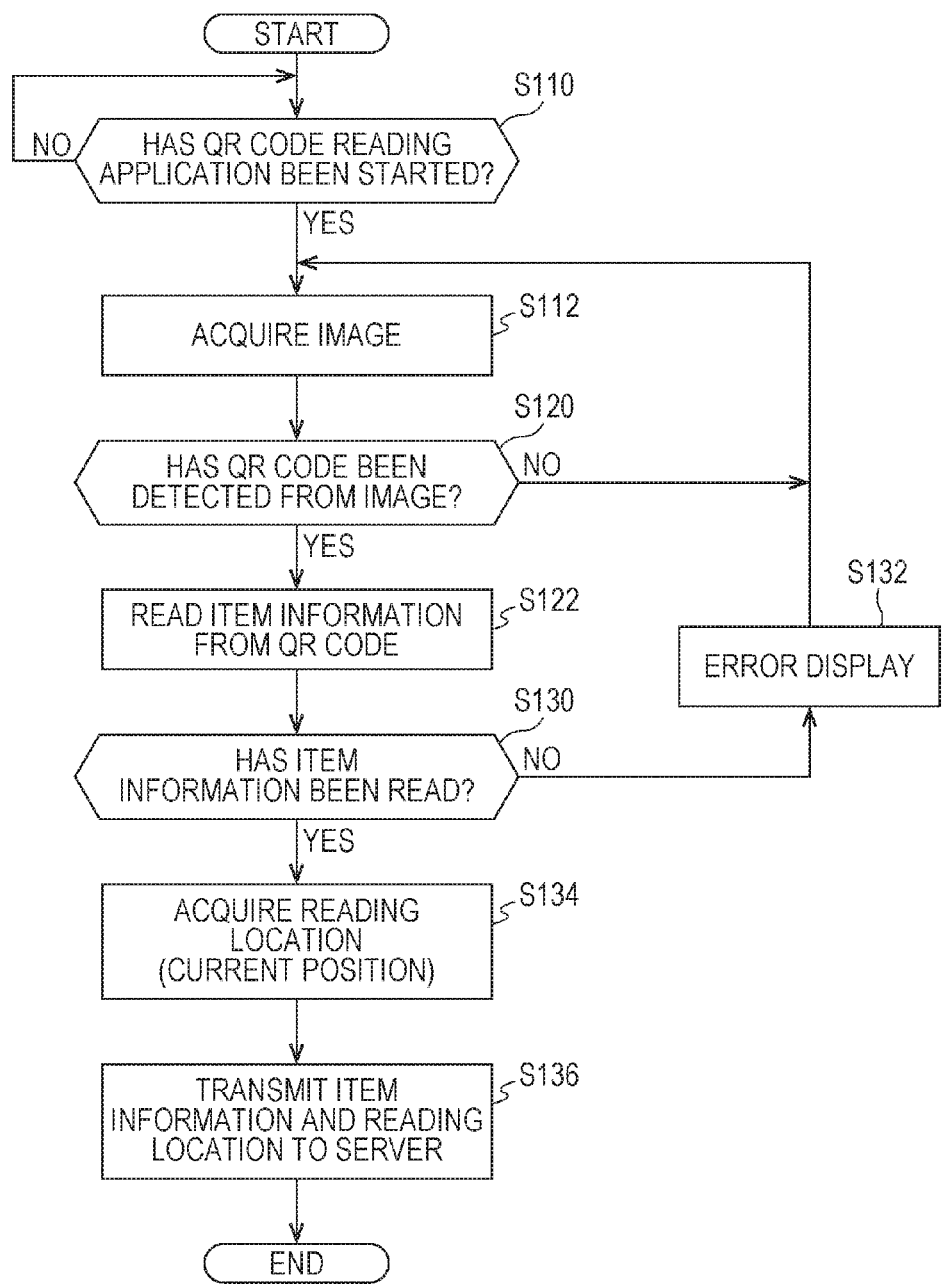
FIG. 7 is a flowchart presenting part of processes executed by the reading terminal in the first embodiment.

The control structure of the reading terminal 100 is described with reference to FIG. 7. FIG. 7 is a flowchart presenting part of processes executed by the reading terminal 100. A control device 101 (refer to FIG. 9) of the reading terminal 100 executes a program to achieve the processes of FIG. 7. In another aspect, a part or all of the processes illustrated in FIG. 7 may be executed by a circuit element or other hardware.

In step S110, the control device 101 determines whether or not a QR code reading application has been started. If determining that the QR code reading application has been started (YES in step S110), the control device 101 switches the control to step S112. If not (NO in step S110), the control device 101 reexecutes the process of step S110.

In step S112, the control device 101 acquires an image from a camera 105 (refer to FIG. 9) described below.

In step S120, the control device 101, as the above-mentioned reader 150 (refer to FIG. 2), determines whether or not a QR code has been detected from the image acquired in step S112. If determining that a QR code has been detected from the image acquired in step S112 (YES in step S120), the control device 101 switches the control to step S122. If not (NO in step S120), the control device 101 returns the control to step S112.

In step S122, the control device 101, as the above-mentioned reader 150, decodes the QR code detected in step S120 to read item information related to the target item.

In step S130, the control device 101 determines whether or not the item information has been read. If determining that the item information has been read (YES in step S130), the control device 101 switches the control to step S134. If not (NO in step S130), the control device 101 switches the control to step S132.

In step S132, the control device 101 causes the reading terminal 100 to display an error screen indicating that it has failed to read the QR code.

In step S134, the control device 101, as the above-mentioned acquisitor 152 (refer to FIG. 2), acquires the current position of the reading terminal 100. The method for acquiring the current position is as described above. Therefore, its description is not repeated. The acquired current position is regarded as the reading location of the QR code.

In step S136, the control device 101 transmits, to the server 200, the item information read in step S122, and the reading location acquired in step S134.

[The Control Structure of the Server 200]

Figure 8:
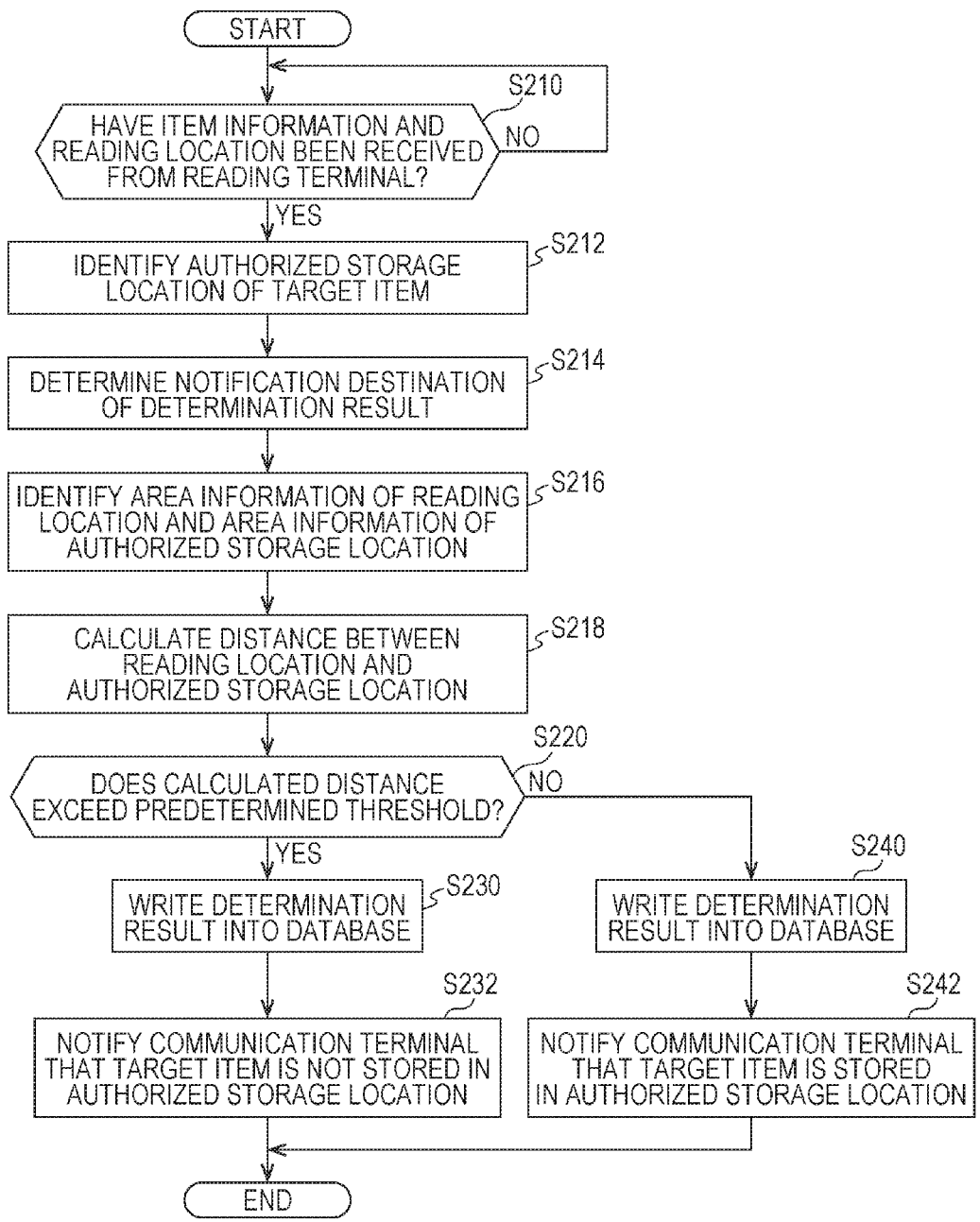
FIG. 8 is a flowchart presenting part of processes executed by the server in the first embodiment.

The control structure of the server 200 is described with reference to FIG. 8. FIG. 8 is a flowchart presenting part of processes executed by the server 200. A control device 201 (refer to FIG. 9) of the server 200 executes a program to achieve the processes of FIG. 8. In another aspect, a part or all of the processes illustrated in FIG. 8 may be executed by the reading terminal 100, the communication terminal 300, a circuit element, or other hardware.

In step S210, the control device 201 determines whether or not the item information read from the QR code and the reading location of the QR code have been received from the reading terminal 100. If determining that the item information and the reading location have been received from the reading terminal 100 (YES in step S210), the control device 201 switches the control to step S212. If not (NO in step S210), the control device 201 reexecutes the process of step S210.

In step S212, the control device 201, as the above-mentioned identifier 250 (refer to FIG. 2), identifies an authorized storage location of the target item. The method for identifying an authorized storage location is as described in FIG. 3. Therefore, its description is not repeated.

In step S214, the control device 201 decides on a notification destination of a determination result of step S220 described below. As an example, the control device 201 decides on a notification destination of a determination result according to the kind of item. The relationship between the kind of item and the notification destination of the determination result may be specified in advance, or freely set.

In step S216, the control device 201 identifies area information of the reading location of the QR code and area information of the authorized storage location. The area information is, for example, an address and a facility name. The relationship between the location information and the area information is specified in advance as map information. The control device 201 identifies the area information of the reading location of the QR code and the area information of the authorized storage location on the basis of the map information.

In step S218, the control device 201 calculates the distance between the reading location of the QR code and the authorized storage location.

In step S220, the control device 201, as the above-mentioned determiner 252 (refer to FIG. 2), determines whether or not the distance calculated in step S218 exceeds the predetermined threshold. If determining that the distance calculated in step S218 exceeds the predetermined threshold (YES in step S220), the control device 201 switches the control to step S230. If not (NO in step S220), the control device 201 switches the control to step S240.

In step S230, the control device 201 writes the determination result of step S220 into the database in the server 200. In other words, the control device 201 writes the fact that the target item is not stored in the authorized storage location into the database in the server 200. At this point in time, the item information of the target item, the area information identified in step S216, the distance calculated in step S218, and the like may be written into the database.

In step S232, the control device 201, as the above-mentioned notifier 254 (refer to FIG. 2), notifies the communication terminal 300 of the fact that the target item is not stored in the authorized storage location. Moreover, the control device 201 further notifies the communication terminal 300 of the item information of the target item, the area information identified in step S216, the distance calculated in step S218, and the like.

In step S240, the control device 201 writes the determination result of step S220 into the database in the server 200. In other words, the control device 201 writes the fact that the target item is stored in the authorized storage location into the database in the server 200. At this point in time, the item information of the target item, the area information identified in step S216, the distance calculated in step S218, and the like may be written into the database.

In step S242, the control device 201, as the above-mentioned notifier 254, notifies the communication terminal 300 of the fact that the target item is stored in the authorized storage location. Moreover, the control device 201 further notifies the communication terminal 300 of the item information of the target item, the area information identified in step S216, the distance calculated in step S218, and the like.

[The Hardware Configuration of the Management System 500]

Figure 9:
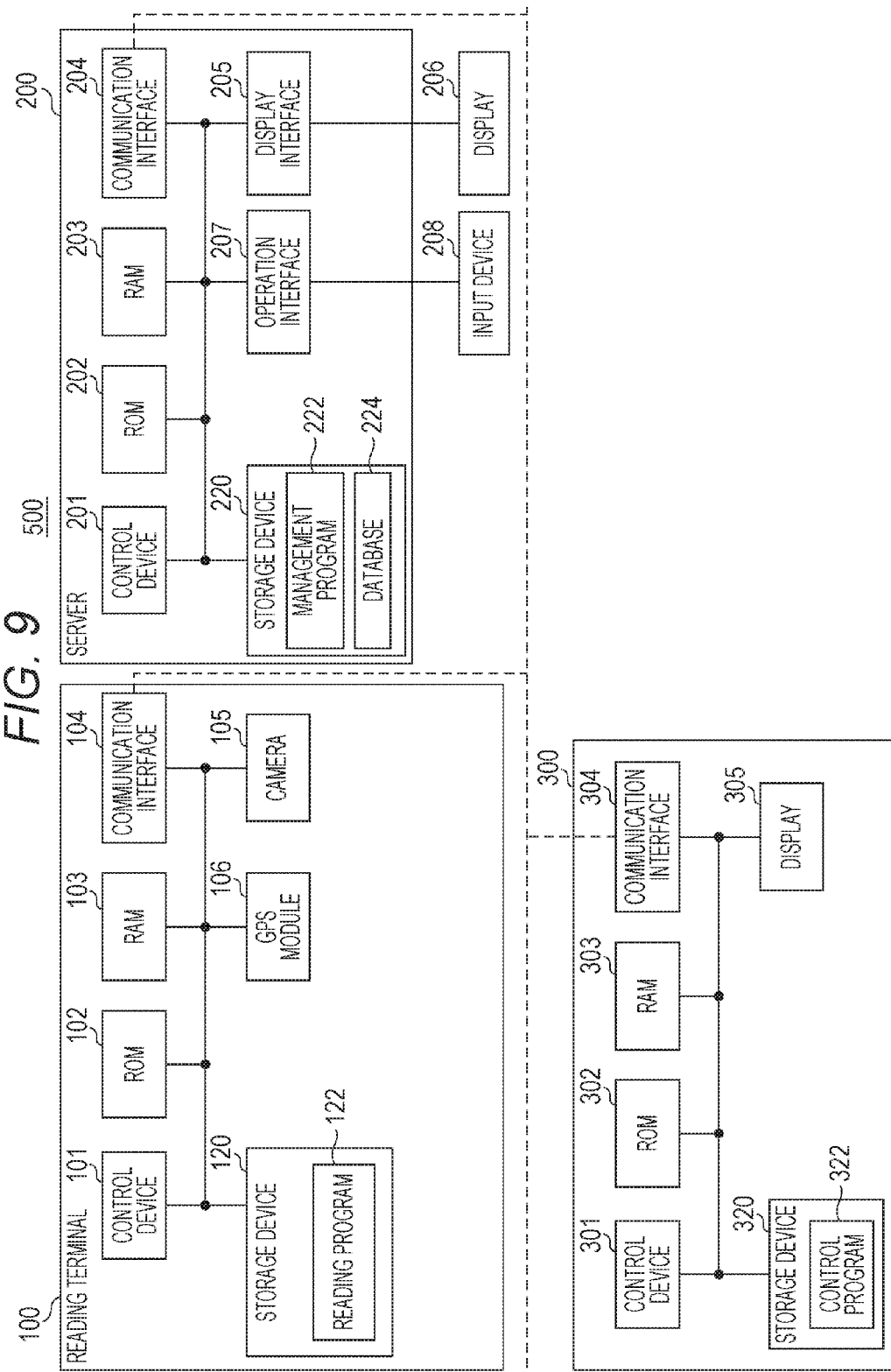
FIG. 9 is a block diagram illustrating the main hardware configuration of the management system according to the first embodiment.

An example of the hardware configuration of the management system 500 is described with reference to FIG. 9. FIG. 9 is a block diagram illustrating the main hardware configuration of the management system 500.

As illustrated in FIG. 9, the management system 500 is configured including the reading terminal 100, the server 200, and the communication terminal 300. The reading terminal 100, the server 200, and the communication terminal 300 are connected to each other via a network.

The hardware configurations of the reading terminal 100, the server 200, and the communication terminal 300 are sequentially described below.

(The Hardware Configuration of the Reading Terminal 100)

As illustrated in FIG. 9, the reading terminal 100 includes the control device 101, a read only memory (ROM) 102, a random access memory (RAM) 103, a communication interface 104, the camera 105, the GPS module 106, and a storage device 120.

The control device 101 controls the reading terminal 100. The control device 101 is configured of, for example, at least one integrated circuit. The integrated circuit is configured of, for example, at least one central processing unit (CPU), at least one application specific integrated circuit (ASIC), at least one field programmable gate array (FPGA), or a combination thereof.

The control device 101 executes various programs such as a reading program 122 according to the embodiment to control the operation of the reading terminal 100. The control device 101 reads the reading program 122 from the storage device 120 into the ROM 102 on the basis of the acceptance of an execution command of the reading program 122. The RAM 103 functions as working memory and temporarily stores various kinds of data necessary to execute the reading program 122.

The communication interface 104 is connected to an antenna (not illustrated) and the like. The reading terminal 100 exchanges data with external communication devices via the antenna. The external communication devices include, for example, the server 200 and the communication terminal 300. The reading terminal 100 may be configured in such a manner as to be able to download the reading program 122 from some other server or the like.

The camera 105 starts shooting on the basis of the start of the QR code reading application. Images obtained from the camera 105 are sequentially outputted to the control device 101. The control device 101 detects a QR code in the images sequentially obtained from the camera 105, decodes the QR code, and accordingly acquires item information.

The GPS module 106 receives a radio wave from each of a plurality of satellites via the antenna (not illustrated) of the reading terminal 100. The GPS module 106 detects the current position of the reading terminal 100 on the basis of the time from when each satellite transmits a radio wave to when the radio wave is received. The current position is expressed in, for example, latitude and longitude.

The storage device 120 is a storage medium such as an embedded MultiMediaCard (eMMC), or flash memory. The reading program 122 according to the embodiment, and the like are stored in the storage device 120. The storage location of the reading program 122 is not limited to the storage device 120, and may be stored in a storage area (for example, a cache) of the control device 101, the ROM 102, the RAM 103, and the external device (for example, the server 200 or the communication terminal 300), or the like.

The reading program 122 may be provided not as a single program but incorporated in part of any given program. In this case, the processes according to the embodiment are achieved in corporation with the given program. Even such a program that does not include part of modules does not depart from the intention of the reading program 122 according to the embodiment. Furthermore, a part or all of the functions provided by the reading program 122 may be achieved by dedicated hardware. Furthermore, the reading terminal 100, the server 200, and the communication terminal 300 may be configured in such a manner as to execute the reading program 122 in corporation. Furthermore, the reading terminal 100 may be configured in such a form as what is called a cloud service where at least one server executes part of the processes of the reading program 122.

(The Hardware Configuration of the Server 200)

The hardware configuration of the server 200 is described continuing reference to FIG. 9.

The server 200 includes the control device 201, a ROM 202, a RAM 203, a communication interface 204, a display interface 205, an operation interface 207, and a storage device 220.

The control device 201 controls the server 200. The control device 201 is configured of, for example, at least one integrated circuit. The integrated circuit is configured of, for example, at least one CPU, at least one ASIC, at least one FPGA, or a combination thereof.

The control device 201 executes various programs such as a management program 222 according to the embodiment to control the operation of the server 200. The control device 201 reads the management program 222 from the storage device 220 into the ROM 202 on the basis of the acceptance of an execution command of the management program 222. The RAM 203 functions as working memory and temporarily stores various kinds of data necessary to execute the management program 222.

The communication interface 204 is connected to an antenna (not illustrated) of the server 200, and the like. The server 200 exchanges data with external communication devices via the antenna. The external communication devices include, for example, the reading terminal 100, the communication terminal 300, and other communication terminals. The server 200 tray be configured in such a manner as to be able to download the management program 222 from the communication terminal.

The display interface 205 is connected to a display 206, and transmits an image signal for displaying an image to the display 206 at the instruction of the control device 201 or the like. The display 206 is, for example, a liquid crystal display, an organic electro luminescence (EL) display, or other display device. When it has been determined that a target item is not stored in its authorized storage location, the display 206 displays a message, an image, or the like indicating the determination.

The operation interface 207 is, for example, a universal serial bus (USB) terminal, and is connected to an input device 208. The operation interface 207 accepts a signal indicating a user operation from the input device 208. The input device 208 is, for example, a mouse, a keyboard, a touchscreen, or other device that can accept a user operation.

The storage device 220 is a storage medium such as a hard disk or external storage device. The management program 222 according to the embodiment, the above-mentioned database 224 (refer to FIG. 3), and the like are stored in the storage device 220. The storage location of the management program 222 and the database 224 is not limited to the storage device 220, and may be stored in a storage area (for example, a cache) of the control device 201, the ROM 202, the RAM 203, an external device (for example, the reading terminal 100 or the communication terminal 300), or the like.

The management program 222 may be provided not as a single program but incorporated as part of any given program. In this case, the processes according to the embodiment are achieved in corporation with the given program. Even such a program that does not include part of modules does not depart from the intention of the management program 222 according to the embodiment. Furthermore, a part or all of the functions provided by the management program 222 may be achieved by dedicated hardware. Furthermore, the reading terminal 100, the server 200, and the communication terminal 300 may be configured in such a manner as to execute the management program 222 in corporation. Furthermore, the reading terminal 100 may be configured in such a form as what is called a cloud service where at least one server executes part of the processes of the management program 222.

(The Hardware Configuration of the Communication Terminal 300)

The hardware configuration of the communication terminal 300 is described continuing reference to FIG. 9.

The communication terminal 300 includes a control device 301, a ROM 302, a RAM 303, a communication interface 304, the display 305, and a storage device 320.

The control device 301 controls the communication terminal 300. The control device 301 is configured of, for example, at least one integrated circuit. The integrated circuit is configured of, for example, at least one CPU, at least one ASIC, at least one FPGA, or a combination thereof.

The control device 301 executes various programs such as a control program 322 to control the communication terminal 300. The control device 301 reads the control program 322 from the storage device 320 into the ROM 302 on the basis of the acceptance of an execution command of the control program 322. The RAM 303 functions as working memory and temporarily stores various kinds of data necessary to execute the control program 322.

The communication interface 304 is connected to an antenna (not illustrated), and the like. The communication terminal 300 exchanges data with external communication devices via the antenna. The external communication devices include, for example, the reading terminal 100 and the server 200. The communication terminal 300 may be configured in such a manner as to be able to download the control program 322 from the server via the antenna.

The display 305 is, for example, a liquid crystal display, an organic EL display, or other display device. The display 305 is laid over a touchscreen to accept various operations on the communication terminal 300 by touch operation. When it has been determined that a target item is not stored in its authorized storage location, the display 305 displays a warning indicating the determination as a message, an image, or the like.

The storage device 320 is a storage medium such as an eMMC or flash memory. As an example, the control program 322 is stored in the storage device 320. The storage location of the control program 322 is not limited to the storage device 320, and may be stored in, for example, a cache of the control device 301, the ROM 302, the RAM 303, or other communication device (for example, the reading terminal 100 and the server 200).

[Summary]

As described above, the reading terminal 100 reads item information from a QR code attached to a target item, and identifies an authorized storage location of the target item. At the same time, the reading terminal 100 acquires the current position. The current position is regarded as a reading location of the QR code. The reading terminal 100 transmits, to the server 200, the authorized storage location of the target item and the reading location of the QR code. The server 200 compares the authorized storage location of the target item with the reading location of the QR code, and determines whether or not the target item is stored in the authorized storage location. As an example, the server 200 calculates the distance between the authorized storage location and the reading location and, if the distance exceeds the predetermined threshold, determines that the target item is not stored in the authorized storage location. In this case, the server 200 transmits, to the communication terminals 300 of a manager and a person in charge on a site, a warning indicating that the target item is not stored in the authorized storage location. Consequently, the manager and the person in charge on the site can check whether or not the target item is stored in the authorized storage location.

Second Embodiment

A second embodiment of the present invention is described below with reference to the drawings. In the following description, the same reference numerals are assigned to the same parts and constituent elements. Their names and functions are also the same. Therefore, their detailed descriptions are not repeated. The embodiments and modifications described below may be selectively combined as appropriate.

[Management System 50000]

Figure 10:
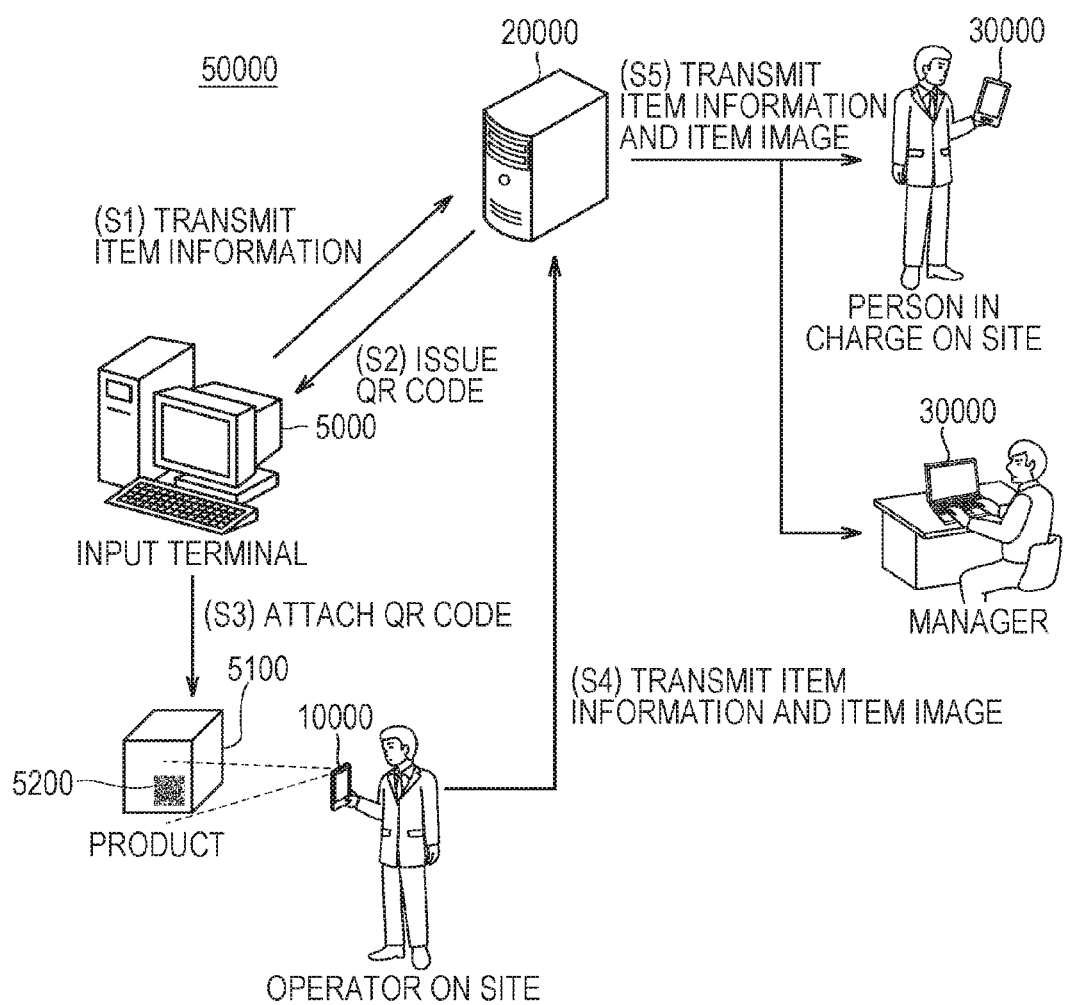
FIG. 10 is a diagram illustrating an example of the system configuration of a management system according to a second embodiment.

The system configuration of a management system 50000 is described with reference to FIGS. 10 and 11. FIG. 10 is a diagram illustrating an example of the system configuration of the management system 50000.

The management system 50000 manages an item 5100 and the like. For example, a product such as a mold part, a lent item, and other things are cited as the item 5100 targeted for management. As illustrated in FIG. 10, the management system 50000 is configured including, for example, an input terminal 5000, a reading terminal 10000, a server 20000, and communication terminals 30000.

The input terminal 5000 accepts an input of item information related to the item 5100 targeted for management. As an example, a manager can input an identification number of the item 5100, the date and time of manufacture of the item 5100, the location of manufacture of the item 5100, and the like, as item information, into the input terminal 5000. When the input of the item information is completed, the input terminal 5000 transmits the inputted item information to the server 20000 as illustrated in step S1.

When receiving the inputted item information from the input terminal, the server 20000 stores the item information and also encodes the item information. The item information may be encoded as a two-dimensional barcode such as a QR code, or may be encoded as a one-dimensional barcode.

In the example of FIG. 10, the server 20000 encodes the inputted item information as a QR code. As illustrated in step S2, the issued QR code is transmitted to the input terminal 5000.

When receiving the QR code from the server 20000, the input terminal 5000 prints out the QR code. As illustrated in step S3, the manager attaches the QR code 5200 printed out to the item 5100. The item 5100 is then transmitted to a site (for example, a lending destination or delivery destination).

The manager checks the state of the item 5100 regularly such as at the time of stocktaking. More specifically, an operator on the site reads the QR code 5200 with the reading terminal 10000. FIG. 11 is a diagram illustrating how the operator on the site reads the QR code 5200 with the reading terminal 10000. The reading terminal 10000 is, for example, a barcode reader, a smartphone, a tablet terminal, or other mobile terminal including a reading function of a QR code. As illustrated in FIG. 11, the operator on the site starts a reading application for reading a QR code. As a result, a camera 10500 (refer to FIG. 19) of the reading terminal 10000 is started. The operator on the site shoots the QR code 5200 with the camera 10500. The reading terminal 10000 detects the QR code 5200 from an image obtained by shooting the QR code 5200. The reading terminal 10000 decodes the detected QR code 5200 and reads the item information related to the item 5100.

The reading terminal 10000 continues shooting even after the QR code 5200 is detected. As illustrated in FIG. 2, the reading terminal 10000 acquires, from the camera 10500, an image presenting part of or entire item 5100 (hereinafter also referred to as "item image") after the detection of the QR code 5200. The reading terminal 10000 associates the acquired item image with the item information read from the QR code 5200 to store the item image. At this point in time, it is required to associate at least part of the item information with the item image. As illustrated in step S4, the reading terminal 10000 then transmits the item information and the item image to the server 20000.

When receiving the item information and the item image from the reading terminal 10000, the server 20000 associates the item image with the item information and stores the item image. As illustrated in step S5, the server 20000 then transmits the item information and the item image, which have been received from the reading terminal 10000, to the communication terminal 30000 of the person in charge on the site and the communication terminal 30000 of the manger in a remote location. Consequently, the person in charge on the site and the manager can check not only the item information related to the item 5100 but also the item image. As a result, the person in charge on the site and the manager can check the state (for example, a flaw) of the item 5100 in more detail.

In FIG. 10, the example where the management system 50000 is configured including the reading terminal 10000, the input terminal 5000, the server 20000, and the communication terminals 30000 is described. However, the management system 50000 is simply required to include at least the reading terminal 10000. Moreover, a part or all of the functions of the reading terminal 10000 may be mounted in the server 20000 and the communication terminal 30000. Alternatively, a part or all of the functions of the server 20000 may be mounted in the reading terminal 10000 and the communication terminal 30000. In other words, one of the reading terminal 10000 and the server 20000 may be configured as the management apparatus, or the reading terminal 10000 and the server 20000 may be integrally configured as the management apparatus.

Moreover, FIG. 10 illustrates the example where the management system 50000 is configured including one reading terminal 10000. However, the management system 50000 may be configured including a plurality of the reading terminals 10000. FIG. 10 illustrates the example where the management system 50000 is configured including one server 20000. However, the management system 50000 may be configured including a plurality of the servers 20000. FIG. 10 illustrates the example where the management system 50000 is configured including a plurality of the communication terminals 30000. However, the management system 50000 may be configured including one communication terminal 30000.

[The Functional Configuration of the Reading Terminal 10000]

Figure 12:
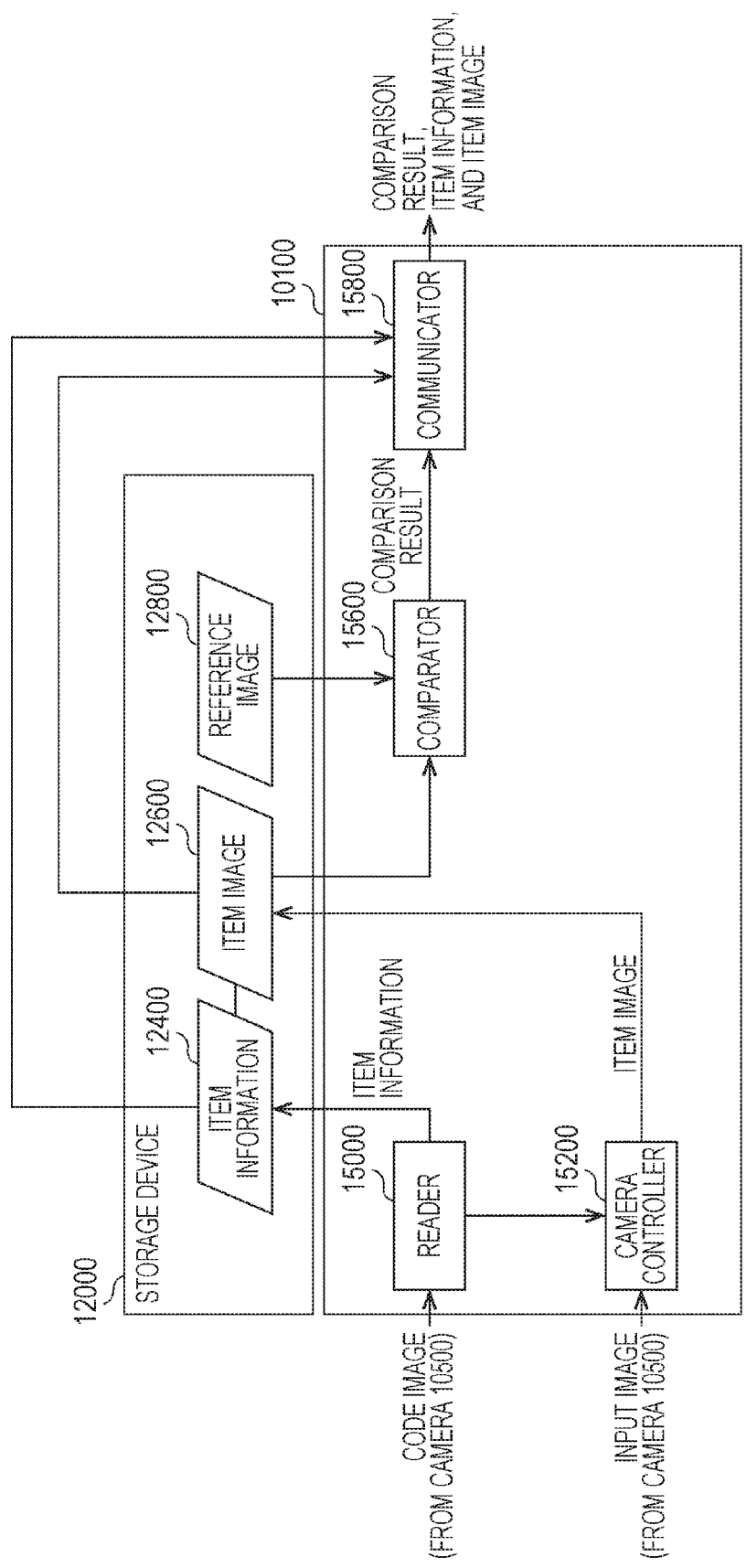
FIG. 12 is a diagram illustrating an example of the functional configuration of a reading terminal according to the second embodiment.

The functions of the reading terminal 10000 are described with reference to FIG. 12. FIG. 12 is a diagram illustrating an example of the functional configuration of the reading terminal 10000.

The reading terminal 10000 includes a control device 10100 and a storage device 12000. The control device 10100 includes a reader 15000, a camera controller 15200, a comparator 15600, and a communicator 15800 as the functional configuration. The functional configuration illustrated in FIG. 12 is sequentially described below.

At least part of the functions of the reading terminal 10000 may be mounted in the server 20000 and the communication terminal 30000.

(Reader 15000)

The reader 15000 detects a QR code from an input image obtained by shooting an item targeted for management (hereinafter also referred to as "target item"), and decodes the encoded QR code to read item information. A method for reading a QR code with the reader 15000 is described below.

The QR code has a rectangular shape. Patterns for position detection called finder patterns are placed at three corners of the QR code. Moreover, square cells are arranged in a grid in the QR code. Each cell is represented in black or white.

The reader 15000 detects the finder patterns of the QR code to detect the QR code from the image on the basis of the positional relationship of the three finder patterns. The reader 15000 converts, into numbers, the arrangement pattern of the black and white cells in the detected QR code, and accordingly reads the item information from the QR code. The item information includes, for example, the identification number of the item, the authorized storage location of the item, the date and time of manufacture of the item, and the location of manufacture of the item. The reading result of the reader 15000 is stored as item information 12400 in the storage device 12000.

In the above description, the example where the reader 15000 reads item information from a QR code is described. However, the reader 15000 may read item information from some other two-dimensional barcode. Alternatively, the reader 15000 may read item information from a one-dimensional barcode. Alternatively, the reader 15000 may read item information from a tag such as RFID.

(Camera Controller 15200)

The camera controller 15200 is described continuing reference to FIG. 12. The camera controller 15200 continues shooting with the camera 10500 also after the reader 15000 detects the QR code 5200. At this point in time, the reading terminal 10000 gives a notice to guide a user in such a manner as to shoot the entire target item (or a predetermined portion). The notice may be given by the display of a message or by the output of audio.

The camera controller 15200 then outputs a shooting instruction to the camera 10500 to acquire an item image 12600 representing the target item. In an aspect, the camera controller 15200 executes a shooting process on the basis of the acceptance of the shooting instruction from the user after the detection of the QR code, and acquires an input image obtained by the shooting process, as the item image 12600.

In another aspect, the camera controller 15200 detects the target item from the input images sequentially obtained from the camera 10500 after the reader 15000 detects the QR code, and acquires the input image where the target item has been detected, as the item image 12600. The item image 12600 is automatically stored to reduce the time and trouble of the user.

Various methods are employed as the method for detecting a target item. As an example, a target item is detected by, for example, image processing such as template matching. In this case, a template image representing a management target item is stored in advance in the reading terminal 10000. The camera controller 15200 scans the template image in the input image obtained from the camera 10500, and calculates the similarity between the template image and each area in the input image. As the method for calculating the similarity, for example, a sum of squared difference (SSD), a sum of absolute difference (SAD), a normalized cross-correlation (NCC), or a zero-mean normalized cross-correlation (ZNCC) is employed. The camera controller 15200 determines that the item has been detected from the input image, on the basis of the fact that the calculated similarity has exceeded a predetermined value.

In the above description, the method where the camera controller 15200 detects an item from an input image by template matching is described. However, the camera controller 15200 may detect an item using some other image processing technology. As an example, the camera controller 15200 may detect an item using a tracking technology such as optical flow.

The camera controller 15200 stores an input image where the target item has been detected as the item image 12600 in the storage device 12000. The item image 12600 targeted for storage may be a still image or moving image, or both of a still image and a moving image.

In an aspect, a still image is stored as the item image 12600. More specifically, after the reader 15000 detects the QR code 5200, the camera controller 15200 causes the camera 10500 to execute a shooting process for acquiring a still image, on the basis of the detection of the target item.

In another aspect, a moving image is stored as the item image 12600. More specifically, the camera controller 15200 causes the camera 10500 to start shooting for acquiring a moving image, on the basis of the fact that the reader 15000 has detected the QR code 5200. The camera controller 15200 then stops the shooting process of the moving image on the basis of the fact that the target item has been detected from the input image. In other words, the camera controller 15200 causes the camera 10500 to execute the shooting process of the moving image during time from the detection of the QR code 5200 to the detection of the target item.

Preferably, the camera controller 15200 switches a shooting mode of the camera 10500 between before and after the detection of the QR code 5200. FIG. 13 is a diagram illustrating how the shooting mode of the camera 10500 is switched between before and after the detection of the QR code 5200.

The shooting mode of the camera 10500 includes a normal shooting mode (first shooting mode) and a wide-angle shooting mode (second shooting mode) with a wide shooting field of view than the normal shooting mode. As illustrated in FIG. 13, the camera controller 15200 sets the shooting mode of the camera 10500 in the normal shooting mode at the time of shooting the QR code 5200. The camera controller 15200 switches the shooting mode of the camera 10500 from the normal shooting mode to the wide-angle shooting mode, on the basis of the detection of the QR code 5200. As a result, the shooting field of view of the camera 10500 becomes wider to contain the item 5100 in the shooting of the camera 10500. Consequently, the user can easily shoot the entire item 5100.

The camera controller 15200 executes the acquisition process of the item image 12600 when the field of view of the camera 10500 includes the entire item 5100, and the field of view of the camera 10500 includes the QR code 5200, and then stores the item image 12600. In this manner, the storage process of the item image 12600 is executed at the timing when the entire item 5100 is included in the field of view of the camera 10500.

Preferably, the camera controller 15200 interrupts the shooting with the camera 10500 when a target item has not been detected from an input image during predetermined time (for example, 30 seconds) after the reader 15000 detected the QR code 5200. Alternatively, in this case, the camera controller 15200 executes the process of outputting a warning indicating that the target item could not been detected from the input image. Consequently, the user can grasp that it failed to successfully shoot the target item.

(Comparator 15600)

The comparator 15600 is described with reference again to FIG. 12. The comparator 15600 compares a reference image 12800 obtained by shooting in advance a target item and the item image 12600 acquired by the camera controller 15200, and determines whether or not the item image 12600 satisfies a predetermined reference.

As an example, the comparator 15600 calculates the similarity between the item image 12600 and the reference image 12800. As a method for calculating the similarity, for example, a SSD, a SAD, a NCC, or a ZNCC is employed. The comparator 15600 determines that the item image 12600 is different from the reference image 12800 if the calculated similarity is lower than a predetermined value, and outputs a warning indicating the determination, as a comparison result, to the communicator 15800.

The reference image 12800 may be a two-dimensional image representing a target item, or may be a three-dimensional image representing a target item. For example, a computer aided design (CAD) data of a target item is used for the reference image 12800 as a three-dimensional image.

Preferably, the comparator 15600 compares the reference image 12800 as a three-dimensional image with the item image 12600. More specifically, the comparator 15600 projects and converts a three-dimensional image to generate a plurality of two-dimensional images representing the target item from different angles. The comparator 15600 compares each of the plurality of generated two-dimensional images and the item image 12600. In this manner, the item image 12600 is compared with the plurality of two-dimensional images representing the target item from different angles; accordingly, the user does not need to care about the shooting angle at the time of shooting the target item.

The comparator 15600 prompts the user to shoot the target item again if determining that the item image 12600 is different from the reference image 12800. Consequently, the reading terminal 10000 can surely enable the user to shoot the item image 12600 similar to the reference image 12800.

In the above description, the example where one item image 12600 is compared with the reference image 12800 is described. However, the comparator 15600 may compare each of a plurality of the item images 12600 obtained by shooting a target item from different angles with the reference image 12800. In this case, the plurality of the item images 12600 includes at least a first item image obtained by shooting the target item from a first angle and a second item image obtained by shooting the target item from a second angle. Preferably, the plurality of the item images 12600 includes item images obtained by shooting the target item 360 degrees all around the target item. The comparator 15600 calculates a similarity to the reference image 12800 for each of the plurality of the item images 12600. The comparator 15600 then determines that the item image 12600 is different from the reference image 12800 if all the calculated similarities are lower than the predetermined value.

Moreover, if both of the item image 12600 and the reference image 12800 are three-dimensional images, the comparator 15600 may compare the item image 12600 and the reference image 12800 by three-dimensional template matching.

(Communicator 15800)

Figures 14, 15:
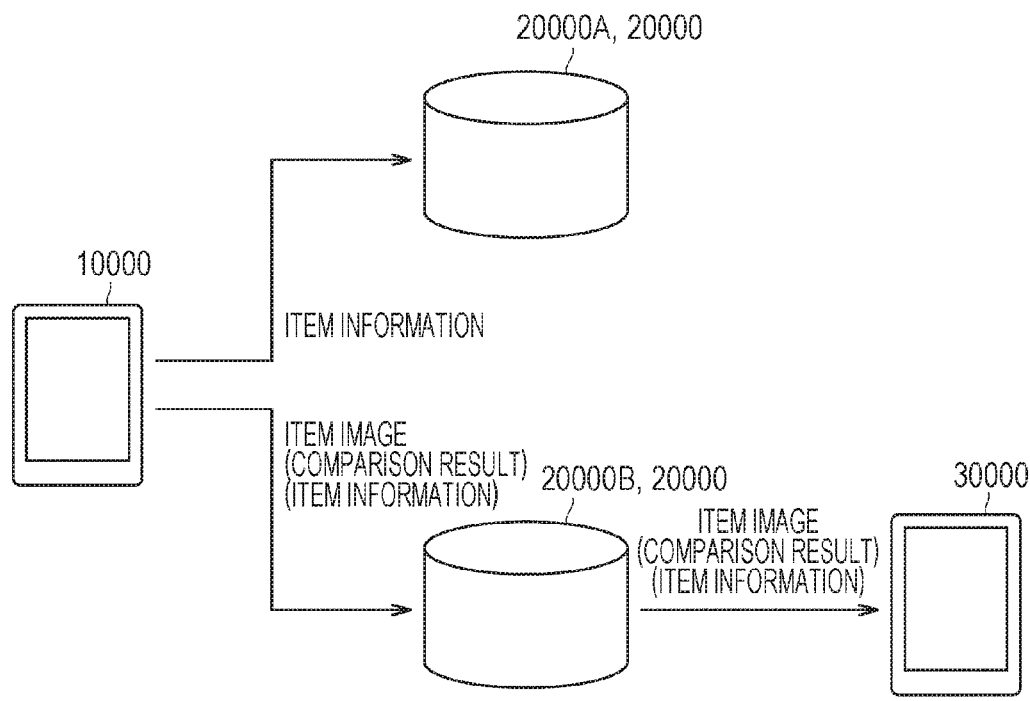
FIG. 14 is a diagram illustrating how a reading result of the reading terminal according to the second embodiment is transmitted to a server.
FIG. 15 is a diagram illustrating an example of the data structure of a database in the second embodiment.

The communicator 15800 is described with reference to FIGS. 14 and 15, continuing reference to FIG. 12. FIG. 14 is a diagram illustrating how a reading result of the reading terminal 10000 is transmitted to the server 20000.

As illustrated in FIG. 14, the communicator 15800 can communicates with a server 20000A (first communication terminal) and a server 20000B (second communication terminal). The storage capacity of the server 20000B is larger than that of the server 20000A. The communicator 15800 transmits, to the server 20000A, the item information 12400 read by the reader 15000. When receiving the item information 12400 from the communicator 15800, the server 20000A stores the item information 12400. On the other hand, the communicator 15800 transmits, to the server 20000B, the item image 12600 acquired by the camera controller 15200. When receiving the item image 12600 from the communicator 15800, the server 20000B stores the item image 12600. In this manner, the item information 12400 whose data size is smaller is stored in the server 20000A, and the item image 12600 whose data size is larger is stored in the server 20000B.

Preferably, the communicator 15800 transmits, to the server 20000B, not only the item image 12600 but also the item information 12400. When receiving the item information 12400 from the reading terminal 10000, the server 20000B associates the item information 12400 with the item image 12600, and then writes the item information 12400 and the item image 12600 into a database 22400 illustrated in FIG. 15. FIG. 15 is a diagram illustrating an example of the data structure of the database 22400. In the database 22400, item information and an item image are associated with each other. The item information includes, for example, an item identification (ID), an item name, and a lot number of a target item. The location and date and time of manufacture of a target item, and the like are identified with the lot number.

More preferably, the communicator 15800 transmits, to the server 20000B, not only the item information 12400 and the item image 12600 but also the comparison result of the comparator 15600. If the comparison result of the comparator 15600 indicates that the item image 12600 is different from the reference image 12800, the communicator 15800 transmits a warning indicating the difference, as the comparison result, to the server 20000B. When receiving the comparison result from the reading terminal 10000, the server 20000B associates the item information 12400 and the item image 12600 with the comparison result, and then writes the item information 12400, the item image 12600, and the comparison result into the database 22400.

[A Notification Screen of the Communication Terminal 30000]

Figure 16:
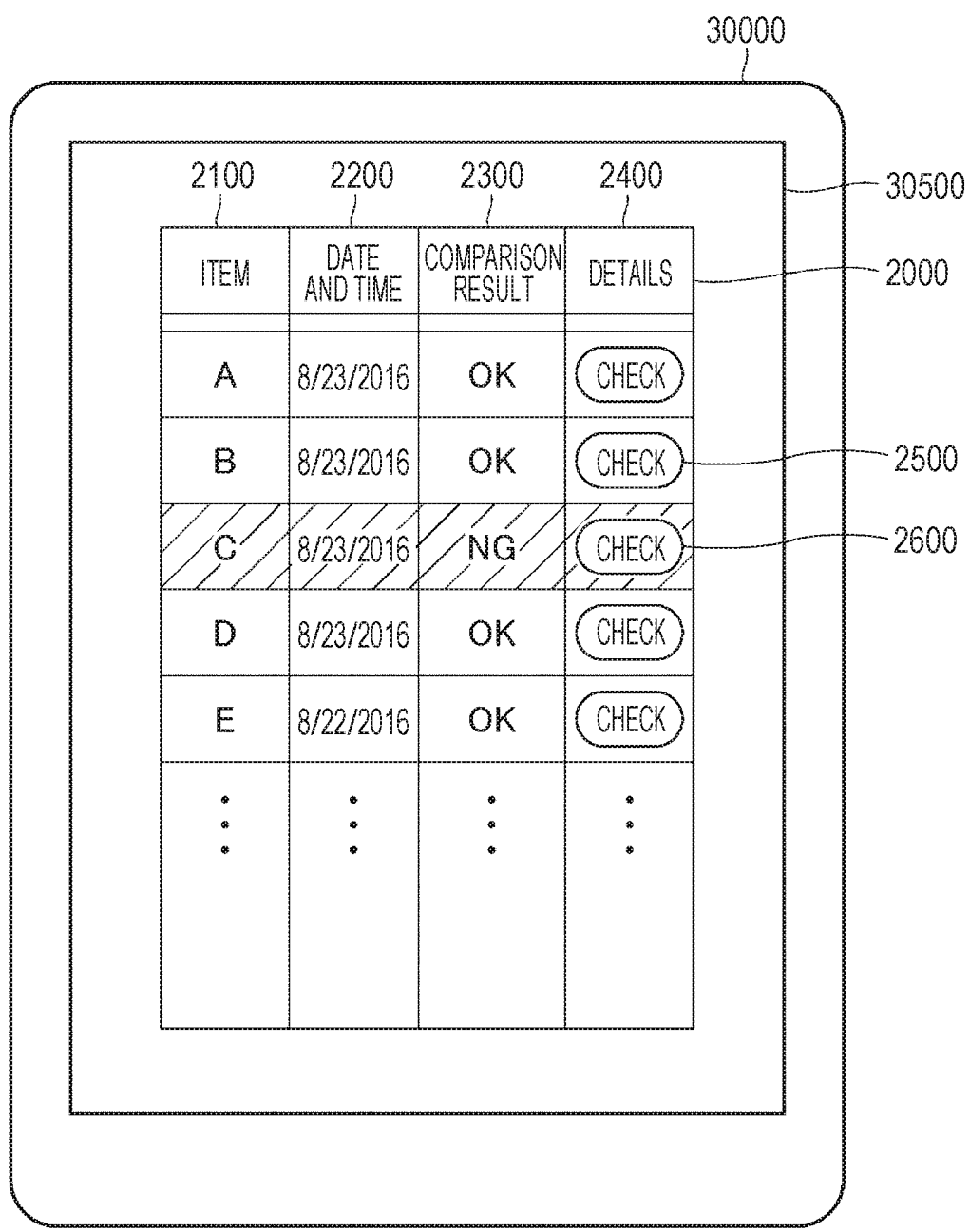
FIG. 16 is a diagram illustrating an example of a notification screen of a communication terminal according to the second embodiment.
Figure 17A:
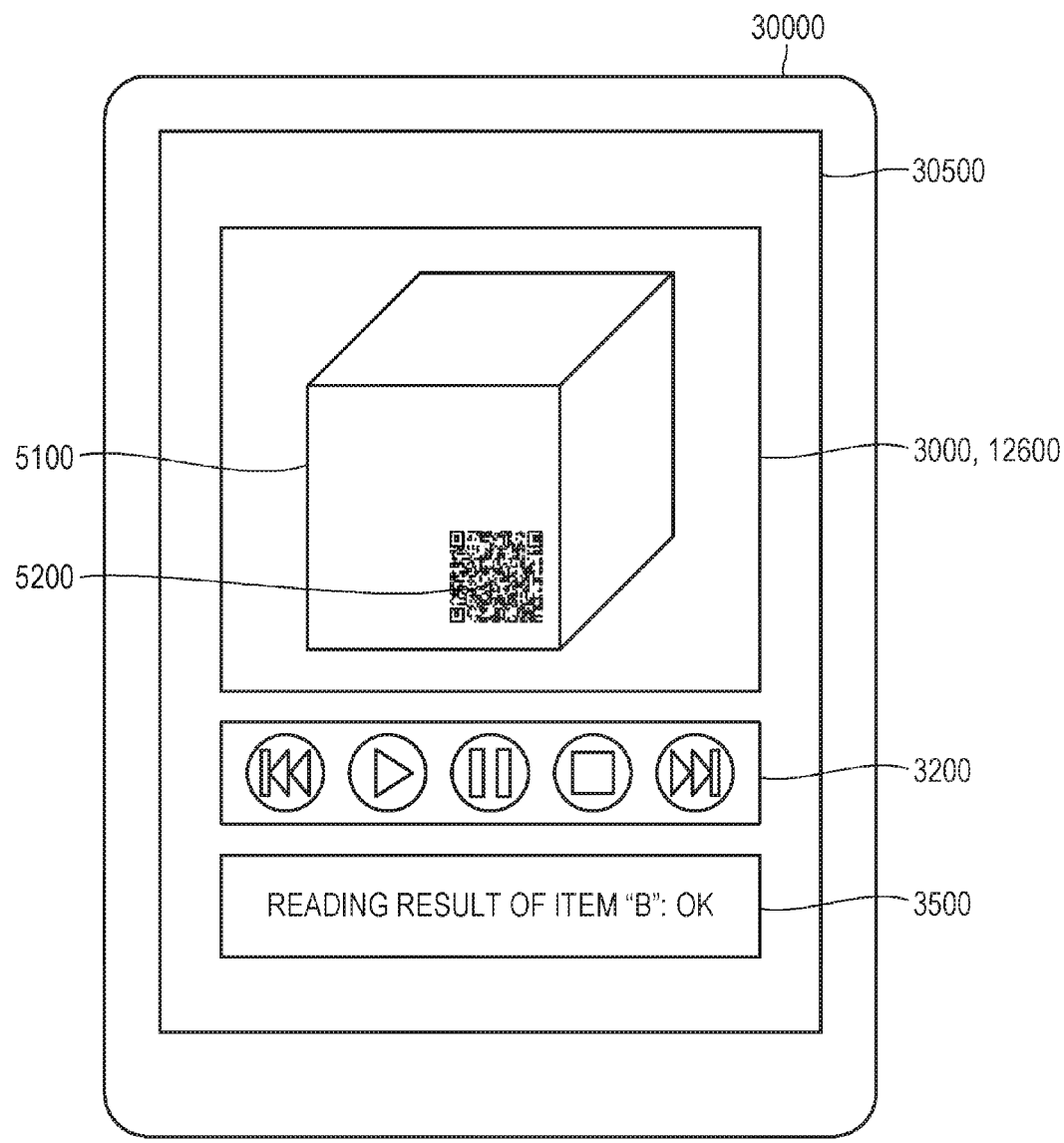
FIGS. 17A and 17B are diagrams illustrating an example of a details screen of a reading result of the reading terminal according to the second embodiment.
Figure 17B:
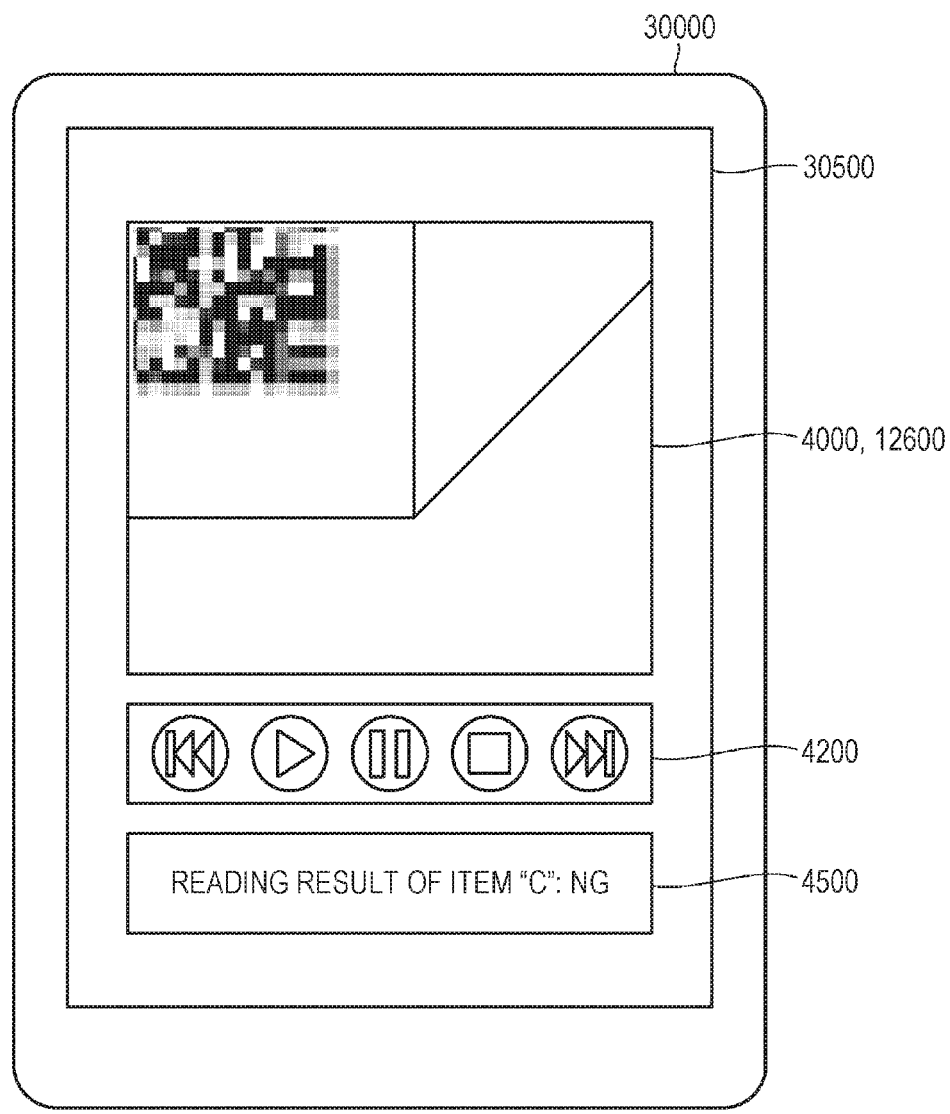

A notification screen of the communication terminal 30000 is described with reference to FIGS. 16, 17A, and 17B. FIG. 16 is a diagram illustrating an example of the notification screen of the communication terminal 30000.

The communication terminal 30000 displays a reading result of a QR code of each item as a list 2000 on a display 30500. The list 2000 contains an item field 2100 indicating the name of a management target item, a date and time field 2200 indicating the reading date and time of the reading terminal 10000, a result field 2300 indicating a reading result of the reading terminal 10000, and a button field 2400. The display of the list 2000 allows the manager or person in charge on the site to easily grasp a reading result of a QR code of each item.

The result field 2300 presents a comparison result of the above-mentioned comparator 15600 (refer to FIG. 12). The comparison result is expressed as "OK" or "NG". If the comparison result is "OK", it indicates that the item image 12600 is similar to the reference image 12800 (refer to FIG. 12). If the comparison result is "NG", it indicates that the item image 12600 is different from the reference image 12800. Preferably, the communication terminal 30000 displays an entry of the comparison result "NG" in a different form from an entry of the comparison result "OK".

The manager or person in charge on the site presses any in the button field 2400 of the list 2000 and accordingly can check a reading result of the reading terminal 10000 in detail. FIGS. 17A and 17B are diagrams illustrating an example of a details screen of a reading result of the reading terminal 10000.

When, for example, checking a reading result of an item "B" whose comparison result is "OK", the manager presses a check button 2500. As a result, as illustrated in FIG. 17A, a details screen of the reading result of the item "B" is displayed on the display 30500. The details screen includes an item image 3000, operating buttons 3200, and a reading result 3500 of the item "B".

The operating buttons 3200 include a play button, a stop button, a pause button, a fast-forward button, and a rewind button. When the play button is pressed, the item image 3000 as a moving image starts being played back. The manager can check the state of the target item more accurately by checking the state of the target item on the moving image. When the stop button is pressed, the playback of the moving image is stopped. When the pause button is pressed, the playback of the moving image is paused. When the fast-forward button is pressed, the playback of the moving image is fast forwarded. When the rewind button is pressed, the playback of the moving image is rewound.

When checking a reading result of an item "C" whose comparison result is "NG", the manager presses a check button 2600. As a result, a details screen of the reading result of the item "C" is displayed on the display 30500 as illustrated in FIG. 17B. The details screen includes an item image 4000, operating buttons 4200, and a reading result 4500 of the item "B". The manager can check the reason of the determination of the reading result "NG" by checking the item image 4000. In the example of FIG. 17B, the reason of the reading result "NG" is that the entire item 5100 was not shot.

[The Control Structure of the Reading Terminal 10000]

Figure 18:
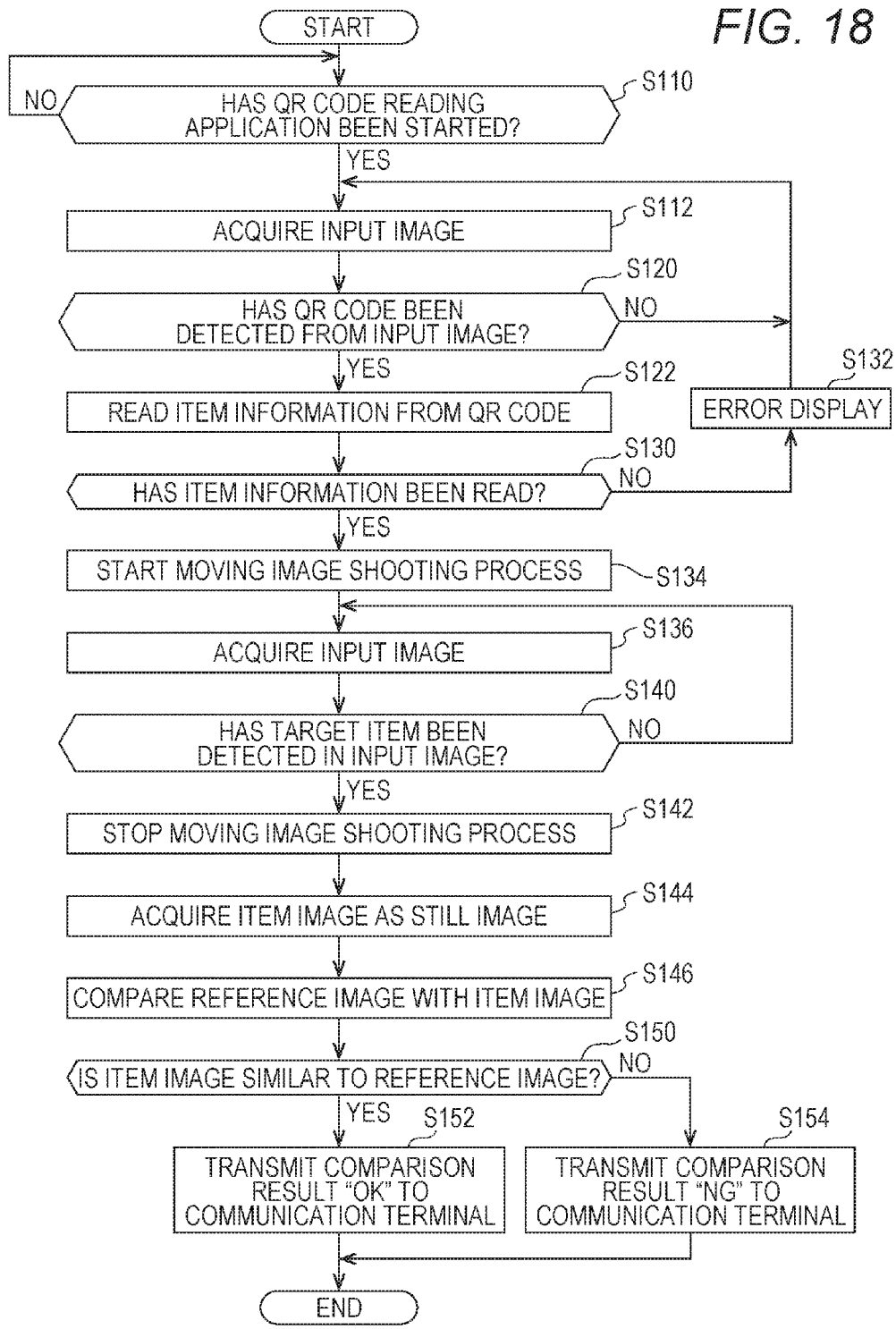
FIG. 18 is a flowchart presenting part of processes executed by the reading terminal according to the second embodiment.

The control structure of the reading terminal 10000 is described with reference to FIG. 18. FIG. 18 is a flowchart presenting part of processes executed by the reading terminal 10000. The control device 10100 (refer to FIG. 12) of the reading terminal 10000 executes a program to achieve the processes of FIG. 18. In another aspect, a part or all of the processes illustrated in FIG. 18 may be executed by the server 20000, the communication terminal 30000, a circuit element, or other hardware.

In step S110, the control device 10100 determines whether or not a QR code reading application has been started. If determining that the QR code reading application has been started (YES in step S110), the control device 10100 switches the control to step S112. If not (NO in step S110), the control device 10100 reexecutes the process of step S110.

In step S112, the control device 10100 acquires an input image from the camera 10500 (refer to FIG. 19) of the reading terminal 10000.

In step S120, the control device 10100, as the above-mentioned reader 15000 (refer to FIG. 12), determines whether or not a QR code has been detected from the input image acquired in step S112. If determining that a QR code has been detected from the input image acquired in step S112 (YES in step S120), the control device 10100 switches the control to step S122. If not (NO in step S120), the control device 10100 returns the control to step S112.

In step S122, the control device 10100, as the above-mentioned reader 15000, decodes the QR code detected in step S120 to read item information related to a target item.

In step S130, the control device 10100 determines whether or not the item information could be read. If determining that the item information could be read (YES, in step S130), the control device 10100 switches the control to step S134. If not (NO in step S130), the control device 10100 switches the control to step S132.

In step S132, the control device 10100 causes the reading terminal 10000 to display an error screen indicating that it failed to read the QR code.

In step S134, the control device 10100, as the above-mentioned camera controller 15200 (refer to FIG. 12), starts the shooting process of a moving image.

In step S136, the control device 10100, as the above-mentioned camera controller 15200, acquires a new input image from the camera 10500.

In step S140, the control device 10100 determines whether or not the target item has been detected in the input image acquired in step S136. The target item is detected by, for example, image processing such as template matching. If determining that the target item has been detected in the input image acquired in step S136 (YES in step S140), the control device 10100 switches the control to step S142. If not (NO in step S140), the control device 10100 returns the control to step S136.

In step S142, the control device 10100, as the above-mentioned camera controller 15200, stops the shooting process of the moving image. As a result, the item image 12600 as the moving image is obtained.

In step S144, the input image where the target item was detected in step S140 is set as the item image 12600 as a still image.

In step S146, the control device 10100, as the above-mentioned comparator 15600 (refer to FIG. 12), compares the reference image 12800 (refer to FIG. 12) obtained by shooting the target item in advance with the item image 12600 obtained in step S142 or step S144. As an example, the control device 10100 calculates the similarity between the item image 12600 and the reference image 12800 to compare the item image 12600 and the reference image 12800. The process of comparing the item image 12600 and the reference image 12800 is as described above. Accordingly, its description is not repeated.

In step S150, the control device 10100 determines whether or not the item image 12600 is similar to the reference image 12800. As an example, if the similarity between the item image 12600 and the reference image 12800 is larger than the predetermined value, the control device 10100 determines that the item image 12600 is similar to the reference image 12800. If determining that the item image 12600 is similar to the reference image 12800 (YES in step S150), the control device 10100 switches the control to step S152. If not (NO in step S150), the control device 10100 switches the control to step S154.

In step S152, the control device 10100 transmits, to the communication terminal 30000 for the manager, the information that the result of the comparison of the item image 12600 and the reference image 12800 is "OK". At the same time, the control device 10100 transmits, to the communication terminal 30000 for the manager, the item information obtained in step S122, the item image 12600 as the still image obtained in step S142, and the item image 12600 as the moving image obtained in step S144. Consequently, the manager can check that the target item is stored in the authorized storage location and also can check the state of the target item in detail.

In step S154, the control device 10100 transmits, to the communication terminal 30000 for the manager, the information that the result of the comparison of the item image 12600 and the reference image 12800 is "NG". At the same time, the control device 10100 transmits, to the communication terminal 30000 for the manager, the item information obtained in step S122, the item image 12600 as the still image obtained in step S142, and the item image 12600 as the moving image obtained in step S144. The manager can check the reason why the comparison result is "NG" by checking the item images. Consequently, the manager can inquire of the person in charge on the site whether or not the target item is stored in the authorized storage location, and instruct the person in charge on the site to shoot the target item again to check the state of the target item.

[The Hardware Configuration of the Management System 50000]

Figure 19:
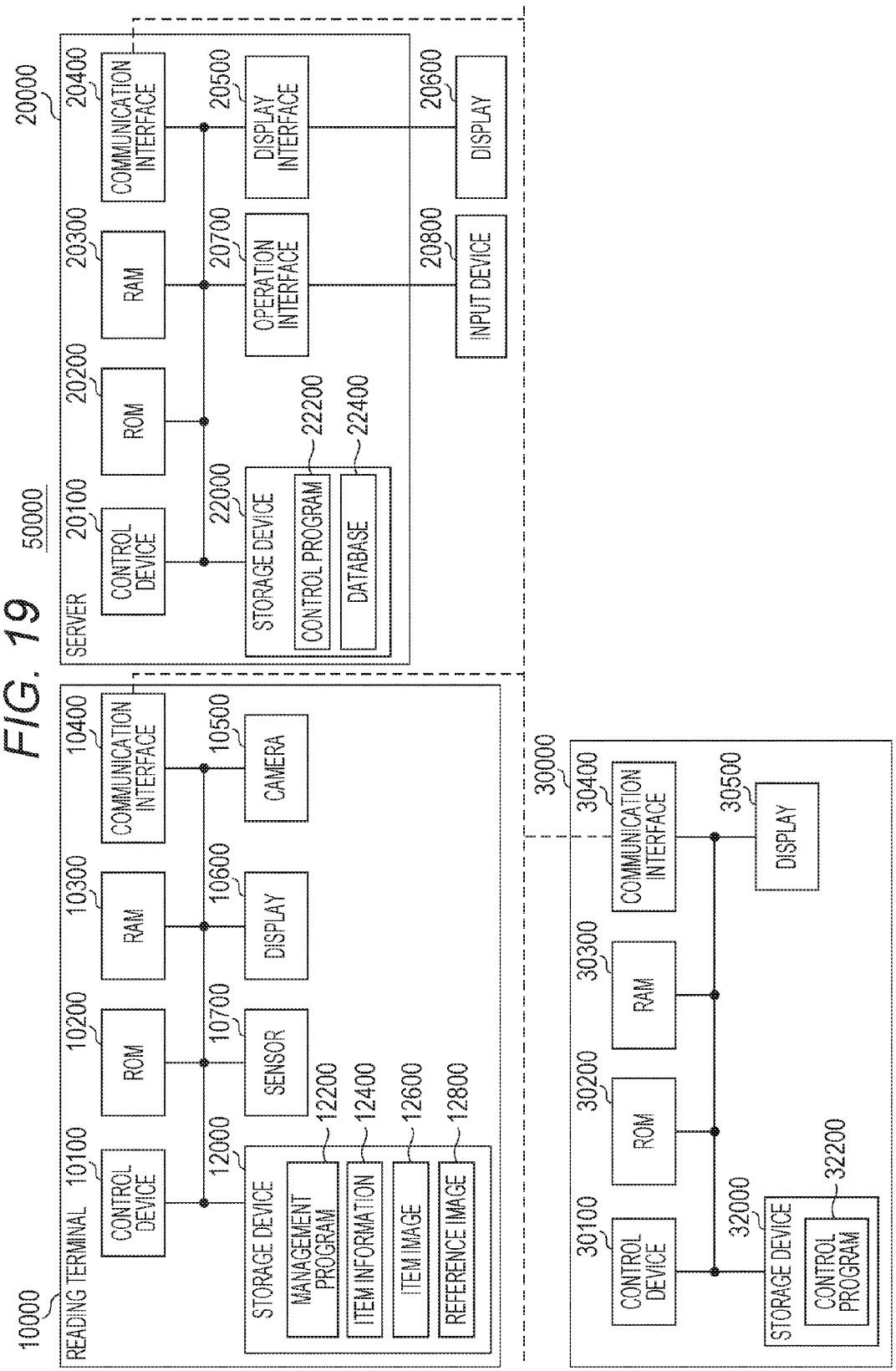
FIG. 19 is a block diagram illustrating the main hardware configuration of the management system according to the second embodiment.

An example of the hardware configuration of the management system 50000 is described with reference to FIG. 19. FIG. 19 is a block diagram illustrating the main hardware configuration of the management system 50000.

As illustrated in FIG. 19, the management system 50000 is configured including the reading terminal 10000, the server 20000, and the communication terminal 30000. The reading terminal 10000, the server 20000, and the communication terminal 30000 are connected to each other via a network.

The hardware configurations of the reading terminal 10000, the server 20000, and the communication terminal 30000 are sequentially described below.

[The Hardware Configuration of the Reading Terminal 10000]

As illustrated in FIG. 19, the reading terminal 10000 includes the control device 10100, a read only memory (ROM) 10200, a random access memory (RAM) 10300, a communication interface 10400, the camera 10500, a display 10600, a sensor 10700, and the storage device 12000.

The control device 10100 controls the reading terminal 10000. The control device 10100 is configured of, for example, one integrated circuit. The integrated circuit is configured of, for example, at least one central processing unit (CPU), at least one application specific integrated circuit (ASIC), at least one field programmable gate array (FPGA), or a combination thereof.

The control device 10100 executes various programs such as a management program 12200 according to the embodiment to control the operation of the reading terminal 10000. The control device 10100 reads the management program 12200 from the storage device 12000 into the ROM 10200 on the basis of the acceptance of an execution command of the management program 12200. The RAM 10300 functions as working memory and temporarily stores various kinds of data necessary to execute the management program 12200.

The communication interface 10400 is connected to an antenna (not illustrated) and the like. The reading terminal 10000 exchanges data with external communication devices via the antenna. The external communication devices include, for example, the server 20000 and the communication terminal 30000. The reading terminal 10000 may be configured in such a manner as to be able to download the management program 12200 from some other server or the like.

The camera 10500 starts shooting on the basis of the start of the QR code reading application. Images obtained from the camera 10500 are sequentially outputted to the control device 10100. The control device 10100 detects a QR code in the images sequentially obtained from the camera 10500, decodes the QR code, and accordingly acquires item information.

The display 10600 is, for example, a liquid crystal display, an organic electro luminescence (EL) display, or other display device. The display 10600 is laid over a touchscreen to accept various operations on the reading terminal 10000 by touch operation. The display 10600 displays a message or image for guiding a user in such a manner as to shoot the entire target item on the basis of the fact that the QR code has been detected from the input image. When the entire target item is not shot within predetermined time after the detection of the QR code, the display 10600 displays an error message, or the like that indicates it.

The sensor 10700 is an angle sensor for detecting the shooting angle of the camera 10500 (that is, the tilt of the camera 10500). The shooting angle indicates the angle between a predetermined reference plane (for example, a horizontal plane) and the optical axis direction of the camera 10500.

The storage device 12000 is a storage medium such as an embedded MultiMediaCard (eMMC), or flash memory. As an example, the management program 12200 according to the embodiment, the item information 12400 read from the target item, the item image 12600 obtained by shooting the target item, the reference image 12800 obtained by shooting the target item in advance, and the like are stored in the storage device 12000. The storage location of the management program 12200, the item information 12400, the item image 12600, and the reference image 12800 is not limited to the storage device 12000, and may be a storage area (for example, cache memory) of the control device 10100, the ROM 10200, the RAM 10300, the external device (for example, the server 20000 or the communication terminal 30000), or the like.

The management program 12200 may be provided not as a single program but incorporated in part of any given program. In this case, the processes according to the embodiment are achieved in corporation with the given program. Even such a program that does not include part of modules does not depart from the intention of the management program 12200 according to the embodiment. Furthermore, a part or all of the functions provided by the management program 12200 may be achieved by dedicated hardware. Furthermore, the reading terminal 10000, the server 20000, and the communication terminal 30000 may be configured in such a manner as to execute the management program 12200 in corporation. Furthermore, the reading terminal 10000 may be configured in such a form as what is called a cloud service where at least one server executes part of the processes of the management program 12200.

(The Hardware Configuration of the Server 20000)

The hardware configuration of the server 20000 is described continuing reference to FIG. 19.

The server 20000 includes a control device 20100, a ROM 20200, a RAM 20300, a communication interface 20400, a display interface 20500, an operation interface 20700, and a storage device 22000.

The control device 20100 controls the server 20000. The control device 20100 is configured of, for example, at least one integrated circuit. The integrated circuit is configured of, for example, at least one CPU, at least one ASIC, at least one FPGA, or a combination thereof.

The control device 20100 executes various programs such as a control program 22200 according to the embodiment to control the operation of the server 20000. The control device 20100 reads the control program 22200 from the storage device 22000 into the ROM 20200 on the basis of the acceptance of an execution command of the control program 22200. The RAM 20300 functions as working memory and temporarily stores various kinds of data necessary to execute the control program 22200.

The communication interface 20400 is connected to an antenna (not illustrated) of the server 20000, and the like. The server 20000 exchanges data with external communication devices via the antenna. The external communication devices include, for example, the reading terminal 10000, the communication terminal 30000, and other communication terminals. The server 20000 may be configured in such a manner as to be able to download the control program 22200 from the communication terminal.

The display interface 20500 is connected to the display 20600, and transmits an image signal for displaying an image to the display 20600 at the instruction of the control device 20100 or the like. The display 20600 is, for example, a liquid crystal display, an organic EL display, or other display device.

The operation interface 20700 is, for example, a universal serial bus (USB) terminal, and is connected to an input device 20800. The operation interface 20700 accepts a signal indicating a user operation from the input device 20800. The input device 20800 is, for example, a mouse, a keyboard, a touchscreen, or other device that can accept a user operation.

The storage device 22000 is a storage medium such as a hard disk or external storage device. The control program 22200 according to the embodiment, the above-mentioned database 22400 (refer to FIG. 15), and the like are stored in the storage device 22000. The storage location of the control program 22200 and the database 22400 is not limited to the storage device 22000, and may be stored in a storage area (for example, cache memory) of the control device 20100, the ROM 20200, the RAM 20300, an external device (for example, the reading terminal 10000 or the communication terminal 30000), or the like.

(The Hardware Configuration of the Communication Terminal 30000)

The hardware configuration of the communication terminal 30000 is described continuing reference to FIG. 19.

The communication terminal 30000 includes a control device 30100, a ROM 30200, a RAM 30300, a communication interface 30400, the display 30500, and a storage device 32000.

The control device 30100 controls the communication terminal 30000. The control device 30100 is configured of, for example, at least one integrated circuit. The integrated circuit is configured of, for example, at least one CPU, at least one ASIC, at least one FPGA, or a combination thereof.

The control device 30100 executes various programs such as a control program 32200 to control the communication terminal 30000. The control device 30100 reads the control program 32200 from the storage device 32000 into the ROM 30200 on the basis of the acceptance of an execution command of the control program 32200. The RAM 30300 functions as working memory and temporarily stores various kinds of data necessary to execute the control program 32200.

The communication interface 30400 is connected to an antenna (not illustrated), and the like. The communication terminal 30000 exchanges data with external communication devices via the antenna. The external communication devices include, for example, the reading terminal 10000 and the server 20000. The communication terminal 30000 may be configured in such a manner as to be able to download the control program 32200 from the server via the antenna.

The display 30500 is, for example, a liquid crystal display, an organic EL display, or other display device. The display 30500 is laid over a touchscreen to accept various operations on the communication terminal 30000 by touch operation. The display 30500 displays the screen illustrated in FIG. 16, the screen illustrated in FIG. 17A or 17B, or the like.

The storage device 32000 is a storage medium such as an eMMC or flash memory. The control program 32200 and the like are stored in the storage device 32000. The storage location of the control program 32200 is not limited to the storage device 32000, and may be stored in, for example, cache memory of the control device 30100, the ROM 30200, the RAM 30300, or other communication device (for example, the reading terminal 10000 or the server 20000).

[Modifications]

In the above description, the reading terminal 10000 detects a target item from an input image obtained after shooting the QR code 5200 to determine whether or not the field of view of the camera 10500 includes the entire target item. In contrast, the reading terminal 10000 according to a modification calculates a distance between the camera 10500 and the target item to determine whether or not the field of view of the camera 10500 includes the entire target item, on the basis of the distance. The determination method is described below.

The reading terminal 10000 accepts an input of the height of the camera 10500 from the ground (hereinafter also referred to as the "height of the camera 10500") at the time of shooting. As an example, the reading terminal 10000 accepts an input of the height of a user, and recognizes a result of subtracting a predetermined value from the height, as the height of the camera 10500. On the precondition that the height of the camera 10500 and the shooting angle are known, and the ground appears in an input image, the distance to the ground included in the field of view of the camera 10500 can be uniquely identified for each pixel in the input image. The reading terminal 10000 calculates the distance for a grounded portion of the target item in the input image. The calculated distance for the grounded portion is recognized as the distance between the camera 10500 and the target item (hereinafter also referred to as the "item distance"). In this manner, the camera controller 15200 calculates the item distance on the basis of the shooting angle of the camera 10500 and the position of the target item in the input image. The reading terminal 10000 determines that the field of view of the camera 10500 includes the entire target item, on the basis of the fact that the item distance has exceeded a predetermined value. If determining that the field of view of the camera 10500 includes the entire target item, the reading terminal 10000 outputs a shooting instruction to the camera 10500, and acquires an image obtained by the shooting instruction from the camera 10500, as an item image.

Preferably, the reading terminal 10000 calculates the item distance after correcting (calibrating) the shooting angle detected by the sensor 10700. More specifically, the reading terminal 10000 instructs the user to keep the reading terminal 10000 horizontal. Consequently, the user places the reading terminal 10000 in such a manner as to bring the surface of the reading terminal 10000 into contact with a floor or the like. The reading terminal 10000 stores a first shooting angle outputted from the sensor 10700 in a horizontal attitude (first reference attitude). Next, the reading terminal 10000 instructs the user to keep the reading terminal 10000 vertical.

Consequently, the user places the reading terminal 10000 in such a manner as to bring the surface of the reading terminal 10000 into contact with a vertical wall or the like. The reading terminal 10000 stores a second shooting angle outputted from the sensor 10700 in a vertical attitude (second reference attitude).

As described above, the shooting angle represents the angle between the ground and the optical axis direction of the camera 10500. Accordingly, when the reading terminal 10000 is in the horizontal attitude, the shooting angle is 90 degrees. When the reading terminal 10000 is in the vertical attitude, the shooting angle is zero degrees. Therefore, the camera controller 15200 corrects the shooting angle outputted from the sensor 10700 in such a manner as that the first shooting angle outputted in the horizontal attitude is 90 degrees, and the second shooting angle outputted in the vertical attitude is zero degrees. The camera controller 15200 calculates the item distance on the basis of the corrected shooting angle and the position of the target item in the input image obtained from the camera 10500.

Preferably, the reading terminal 10000 further calculates the actual height of the target item from the ground by triangulation based on the item distance, the shooting angle, and the height of the target item in the input image. In this case, the reading terminal 10000 determines that the field of view of the camera 10500 includes the entire target item on the basis of the facts that the distance between the camera 10500 and the target item has exceeded the predetermined value and that the actual height of the target item has exceeded a predetermined value.

[Summary]

As described above, the reading terminal 10000 detects a QR code from an input image obtained by shooting a target item, decodes the QR code, and accordingly acquires item information related to the target item. The reading terminal 10000 continues shooting also after detecting the QR code. The management system 50000 detects the target item from an input image obtained after detecting the QR code, and acquires the input image where the target item has been detected, as an item image. The reading terminal 10000 associates the item image with the read item information and stores the item image. The reading terminal 10000 then transmits the item information and the item image to the communication terminal 30000 for the manager via the server 20000. Consequently, the manager can check not only the item information read from the QR code but also the item image. As a result, the manager can see the state of the target item in detail.

Moreover, if a person in charge on a site or a supplier shoots a target item and transmits the result to a manager, a portion where the manager desires to check may not be shot. In this case, the manager needs to contact the person in charge on the site or supplier to see the state of the target item. However, the reading terminal 10000 according to the embodiment shoots the target item automatically when the field of view of the camera 10500 includes the entire target item (or a predetermined portion); accordingly, the portion Where the manager desires to check can be reliably shot. As a result, the manager's time and trouble to ask the person in charge on the site or supplier about the state of the target item is reduced.

Moreover, there has been a problem on the site that a product targeted for management is resold. In this case, the reseller peels a QR code off the product, and transmits item information read from the QR code to the manger to pretend that the product is on hand. However, the reading terminal 10000 according to the embodiment also shoots the target item upon reading of the QR code, and transmits, to the communication terminal 30000 for the manager, an item image together with the item information read from the QR code. The manager can check the item image and accordingly can check that the product is stored in the management location.

Although embodiments of the present invention have been described and illustrated in detail, it is clearly understood that the same is by way of illustration and example only and not limitation, the scope of the present invention should be interpreted by terms of the appended claims. The scope of the present invention is intended to include meanings equivalent to the claims, and all modifications within the scope.

What is claimed is:

1. A management system comprising:
    a reader that reads item information related to a target item from the target item;
    an identifier that identifies an authorized storage location where the target item is required to be stored, on the basis of the item information read by the reader;
    an acquisitor that acquires a reading location where the item information has been read; and
    a determiner that compares the authorized storage location with the reading location and determines whether or not the target item is stored in the authorized storage location.

2. The management system according to claim 1, further comprising a storage that stores a database specifying item storage locations according to item identification information, wherein
    the item information includes identification information of the target item, and
    the identifier identifies a storage location corresponding to the identification information of the target item as the authorized storage location among the storage locations specified in the database.

3. The management system according to claim 1, wherein the item information includes location information indicating the authorized storage location.

4. The management system according to claim 1, further comprising a notifier that notifies a communication terminal of a determination result of the determiner.

5. The management system according to claim 4, wherein the notifier transmits the determination result to a plurality of different communication terminals.

6. The management system according to claim 1, wherein the determiner
    calculates a distance between the authorized storage location and the reading location, determines that the target item is stored in the authorized storage location upon the distance being within a predetermined threshold, and determines that the target item is not stored in the authorized storage location upon the distance exceeding the predetermined threshold.

7. A management apparatus comprising:

a reader that reads item information related to a target item from the target item;

an identifier that identifies an authorized storage location where the target item is required to be stored, on the basis of the item information read by the reader;

an acquisitor that acquires a reading location where the item information has been read; and a determiner that compares the authorized storage location with the reading location and determines whether or not the target item is stored in the authorized storage location.

8. A management method comprising:

reading item information related to a target item from the target item;

identifying an authorized storage location where the target item is required to be stored, on the basis of the read item information;

acquiring a reading location where the item information has been read; and comparing the authorized storage location with the reading location and determining whether or not the target item is stored in the authorized storage location.

9. A non-transitory recording medium storing a computer readable item management program, the program causing a computer to perform:

reading item information related to a target item from the target item;

identifying an authorized storage location where the target item is required to be stored, on the basis of the read item information;

acquiring a reading location where the item information has been read; and comparing the authorized storage location with the reading location and determining whether or not the target item is stored in the authorized storage location.

\* \* \* \* \*